US012770402B2

(12) United States Patent
Wang et al.

(10) Patent No.: US 12,770,402 B2

(45) Date of Patent: Oct. 20, 2026

(54) SYSTEMS AND METHODS FOR MONITORING CONTROL

(71) Applicant: ZHEJIANG DAHUA TECHNOLOGY CO., LTD., Hangzhou (CN)

(72) Inventors: Jianmiao Wang, Hangzhou (CN); Fenghai Qian, Hangzhou (CN); Feiyue Zhu, Hangzhou (CN); Yumin Dong, Hangzhou (CN); Yi Wu, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 21 days.

(21) Appl. No.: 19/173,780

(22) Filed: Apr. 8, 2025

(65) Prior Publication Data

US 2025/0239083 A1 Jul. 24, 2025

Related U.S. Application Data

(63) Continuation-in-part of application No. 18/061,475, filed on Dec. 4, 2022, now Pat. No. 12,283,177, (Continued)

(30) Foreign Application Priority Data

Jun. 30, 2020 (CN) ......................... 202010620913.9
Jun. 30, 2020 (CN) ......................... 202010623002.1

(51) Int. Cl.

*G06V 20/52* (2022.01)
*G06V 10/25* (2022.01)

(Continued)

(52) U.S. Cl.

CPC .............. *G06V 20/52* (2022.01); *G06V 10/25* (2022.01); *G06V 20/44* (2022.01); *H04N 23/73* (2023.01); *H04N 23/745* (2023.01)

(58) Field of Classification Search

CPC ...... H04N 23/531; H04N 23/73; H04N 23/74; H04N 23/745; G08B 13/196

See application file for complete search history.

(56) References Cited

U.S. PATENT DOCUMENTS

2009/0160937 A1 6/2009 Son
2010/0321676 A1 12/2010 Sasaki et al.

(Continued)

FOREIGN PATENT DOCUMENTS

CN 106971553 A 7/2017
CN 106973241 A 7/2017

(Continued)

OTHER PUBLICATIONS

First Office Action in Chinese Application No. 202110444443.X mailed on Feb. 28, 2022, 17 pages.

*Primary Examiner* — Jayanti K Patel
*Assistant Examiner* — Christopher Kingsbury Glover
(74) *Attorney, Agent, or Firm* — METIS IP LLC

(57) ABSTRACT

The present disclosure relates to systems and methods for monitoring control. The systems may obtain monitoring images associated with a monitoring region captured by a monitoring device, determine whether a target event occurs in the monitoring region based on the monitoring images. In response to determining that the target event occurs in the monitoring region, the systems may determine a target time period associated with operations of a warning light associated with the monitoring device based on the end exposure time of the last exposure row corresponding to the frame and the start exposure time of the first exposure row corresponding to the next frame. The systems may control the opera- (Continued)

tions of the warning light based on the target time period. The systems may determine a target blanking region, adjust waiting time of the monitoring device or determine adjustment parameters of the monitoring device based on the target blanking region.

20 Claims, 14 Drawing Sheets

Related U.S. Application Data which is a continuation of application No. PCT/CN2020/137575, filed on Dec. 18, 2020.

(51) Int. Cl.

| | |
|---|---|
| ***G06V 20/40*** | (2022.01) |
| ***H04N 23/73*** | (2023.01) |
| ***H04N 23/745*** | (2023.01) |

(56) References Cited

U.S. PATENT DOCUMENTS

| | | | |
|---|---|---|---|
| 2011/0298947 A1 | 12/2011 | Guo et al. | |
| 2014/0300817 A1 | 10/2014 | Bezman et al. | |
| 2016/0100088 A1 | 4/2016 | Sekiguchi et al. | |
| 2017/0323165 A1 | 11/2017 | Haebig | |
| 2018/0101154 A1* | 4/2018 | Nomoto | G01J 1/4204 |
| 2018/0213141 A1* | 7/2018 | Pandit | H04N 23/56 |
| 2019/0246477 A1* | 8/2019 | Sinitsyn | H05B 47/125 |
| 2019/0287367 A1 | 9/2019 | Birnkrant et al. | |
| 2023/0347502 A1 | 11/2023 | Wang et al. | |

FOREIGN PATENT DOCUMENTS

| | | | |
|---|---|---|---|
| CN | 206907049 U | | 1/2018 |
| CN | 107818283 A | | 3/2018 |
| CN | 108470450 A | | 8/2018 |
| CN | 108566517 A | | 9/2018 |
| CN | 110099221 A | | 8/2019 |
| CN | 110830729 A | | 2/2020 |
| CN | 111064901 A | | 4/2020 |
| CN | 111653101 A | | 9/2020 |
| CN | 111654639 A | | 9/2020 |
| EP | 2512122 A1 | | 10/2012 |
| JP | H0693606 A | | 4/1994 |
| JP | 2006295591 A | * | 10/2006 |
| JP | 2010278614 A | | 12/2010 |
| JP | 2011029759 A | | 2/2011 |
| JP | 6399572 B1 | | 10/2018 |
| WO | 2010108186 A1 | | 9/2010 |
| WO | 2022062802 A1 | | 3/2022 |

* cited by examiner

500

SYSTEMS AND METHODS FOR MONITORING CONTROL

CROSS-REFERENCE TO RELATED APPLICATIONS

This application is a Continuation-in-part of U.S. patent application Ser. No. 18/061,475, filed on Dec. 4, 2022, which is a Continuation of International Application No. PCT/CN2020/137575 filed on Dec. 18, 2020, which claims priority to Chinese Patent Application No. 202010623002.1 filed on Jun. 30, 2020 and Chinese Patent Application No. 202010620913.9 filed on Jun. 30, 2020, the contents of each of which are incorporated herein by reference in their entirety.

TECHNICAL FIELD

The present disclosure generally relates to monitoring technology, and in particular, to systems and methods for controlling a warning light associated with a monitoring device.

BACKGROUND

With the development of communication and multimedia technologies, the exploration of monitoring technology and monitoring devices has developed rapidly nowadays. Commonly, when detecting an abnormality, a monitoring device (e.g., a security camera) may issue a warning by causing a warning light associated with the monitoring device to flicker. However, the flicker of the warning light may cause a brightness change (e.g., change between light and dark) of monitoring environment of the monitoring device, which may affect the monitoring effect (e.g., image quality of monitoring images) of the monitoring device. Therefore, it is desirable to provide systems and methods for controlling the warning light associated with the monitoring device to flicker at an appropriate time, thereby reducing the impact of the flicker of the warning light on the monitoring effect of the monitoring device.

SUMMARY

An aspect of the present disclosure relates to a system for monitoring control. The system may include at least one storage device including a set of instructions; and at least one processor in communication with the at least one storage device, wherein when executing the set of instructions, the at least one processor is directed to perform operations including: obtaining one or more monitoring images associated with a monitoring region captured by a monitoring device; determining whether a target event occurs in the monitoring region based on the one or more monitoring images; in response to determining that the target event occurs in the monitoring region, obtaining, for a frame of the monitoring device, an end exposure time of a last exposure row among a plurality of exposure rows that are sequentially exposed by a shutter of the monitoring device; obtaining, for a next frame of the monitoring device, a start exposure time of a first exposure row among the plurality of exposure rows; determining a target time period associated with operations of a warning light associated with the monitoring device based on the end exposure time of the last exposure row corresponding to the frame and the start exposure time of the first exposure row corresponding to the next frame; controlling the operations of the warning light based on the target time period; determining a target blanking region based on reference parameters of the warning light, the reference parameters including a type of the warning light; and in response to determining that the monitoring device satisfies a preset condition, adjusting waiting time of the monitoring device based on the target blanking region; or in response to determining that the monitoring device does not satisfy the preset condition, determining adjustment parameters of the monitoring device based on the target blanking region.

In some embodiments, the at least one processor is directed to perform operations including determining the adjustment parameters based on the target blanking region and environmental characteristics, wherein the environmental characteristics include ambient light intensity.

In some embodiments, the at least one processor is directed to perform operations including determining at least one set of candidate adjustment parameters based on the target blanking region; determining at least one energy consumption value corresponding to the at least one set of candidate adjustment parameters; and determining the adjustment parameters based on the at least one energy consumption value.

In some embodiments, the at least one processor is directed to perform operations including for each set of candidate adjustment parameters in the at least one set of candidate adjustment parameters, determining a first score based on the each set of candidate adjustment parameters, the target blanking region, and a type of the target event; determining a second score based on the each set of candidate adjustment parameters, the target blanking region, and morphological change characteristics of the target event; and determining a comprehensive evaluation value based on the first score and the second score; and determining the adjustment parameters based on at least one comprehensive evaluation value corresponding to the at least one set of candidate adjustment parameters.

In some embodiments, the at least one processor is directed to perform operations including determining the comprehensive evaluation value based on the first score, the second score, and an energy consumption value corresponding to the each set of candidate adjustment parameters.

In some embodiments, the at least one processor is directed to perform operations including determining the target blanking region based on a type of the target event and morphological change characteristics of the target event.

In some embodiments, the reference parameters further include flicker characteristics, the at least one processor is directed to perform operations including determining the flicker characteristics based on a type of the target event and morphological change characteristics of the target event.

In some embodiments, the at least one processor is directed to perform operations including in response to determining that the target event occurs in the monitoring region, controlling the warning light to remain lit and/or flicker in the target blanking region, and controlling the warning light to remain lit in the non-blanking region; or in response to determining that the target event does not occur in the monitoring region, determining whether to control the warning light to remain lit based on environmental characteristics.

In some embodiments, the at least one processor is directed to perform operations including in response to determining that the target event occurs in the monitoring region, determining whether to control the warning light to remain lit in the target blanking region based on the environmental characteristics, and determining whether to control the warning light to remain lit in the non-blanking region based on the environmental characteristics.

In some embodiments, the at least one processor is directed to perform operations including for each of the operations of the warning light, determining a required time based on the reference parameter of the warning light, a flicker frequency of the warming warning light, a high level duration, or a low level duration of the flicker of the warning light; determining a required target time period based on at least one of the required times corresponding to the operations of the warning light; adjusting the adjustment parameters of the monitoring device to adjust the target time period to satisfy the required target time period; and controlling the operations of the warning light based on the adjusted target time period.

In some embodiments, the at least one processor is directed to perform operations including obtaining an end exposure time of a first exposure row among a plurality of exposure rows that are sequentially exposed by a shutter of the monitoring device; obtaining a start exposure time of a last exposure row among the plurality of exposure rows; and determining the target time period based on the end exposure time of the first exposure row and the start exposure time of the last exposure row.

In some embodiments, the at least one processor is directed to perform operations including controlling the warning light to keep turned on within the target time period and to keep turned off outside of the target time period.

In some embodiments, the at least one processor is directed to perform operations including determining whether the warning light associated with the monitoring device is turned on; in response to determining that the warning light associated with the monitoring device is turned on, increasing, in the target time period, a power consumption of the warning light based at least in part on the at least one parameter of the monitoring device and the target time period; and controlling the warning light to keep turned on under the increased power consumption within the target time period.

In some embodiments, the at least one processor is directed to perform operations including when a difference between the end exposure time of the first exposure row and the start exposure time of the last exposure row is less than or equal to 0, adjusting the adjustment parameters of the monitoring device so that the difference between the end exposure time of the first exposure row and the start exposure time of the last exposure row is larger than 0, determining an adjusted end exposure time of the first exposure row and an adjusted start exposure time of the last exposure row based on the adjustment parameters, and determining a difference between the adjusted end exposure time of the first exposure row and the adjusted start exposure time of the last exposure row as the target time period.

A further aspect of the present disclosure relates to a method for monitoring control. The method may be implemented on a computing device including at least one processor, at least one storage medium, and a communication platform connected to a network. The method may include obtaining one or more monitoring images associated with a monitoring region captured by a monitoring device; determining whether a target event occurs in the monitoring region based on the one or more monitoring images; in response to determining that the target event occurs in the monitoring region, obtaining, for a frame of the monitoring device, an end exposure time of a last exposure row among a plurality of exposure rows that are sequentially exposed by a shutter of the monitoring device; obtaining, for a next frame of the monitoring device, a start exposure time of a first exposure row among the plurality of exposure rows; determining a target time period associated with operations of a warning light associated with the monitoring device based on the end exposure time of the last exposure row corresponding to the frame and the start exposure time of the first exposure row corresponding to the next frame; controlling the operations of the warning light based on the target time period; determining a target blanking region based on reference parameters of the warning light, the reference parameters including a type of the warning light; and in response to determining that the monitoring device satisfies a preset condition, adjusting waiting time of the monitoring device based on the target blanking region; or in response to determining that the monitoring device does not satisfy the preset condition, determining adjustment parameters of the monitoring device based on the target blanking region.

A still further aspect of the present disclosure relates to a non-transitory computer readable medium including executable instructions. When the executable instructions are executed by at least one processor, the executable instructions may direct the at least one processor to perform a method. The method may include obtaining one or more monitoring images associated with a monitoring region captured by a monitoring device; determining whether a target event occurs in the monitoring region based on the one or more monitoring images; in response to determining that the target event occurs in the monitoring region, obtaining, for a frame of the monitoring device, an end exposure time of a last exposure row among a plurality of exposure rows that are sequentially exposed by a shutter of the monitoring device; obtaining, for a next frame of the monitoring device, a start exposure time of a first exposure row among the plurality of exposure rows; determining a target time period associated with operations of a warning light associated with the monitoring device based on at least one parameter of the monitoring device based on the end exposure time of the last exposure row corresponding to the frame and the start exposure time of the first exposure row corresponding to the next frame; controlling the operations of the warning light based on the target time period; determining a target blanking region based on reference parameters of the warning light, the reference parameters including a type of the warning light; and in response to determining that the monitoring device satisfies a preset condition, adjusting waiting time of the monitoring device based on the target blanking region; or in response to determining that the monitoring device does not satisfy the preset condition, determining adjustment parameters of the monitoring device based on the target blanking region.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
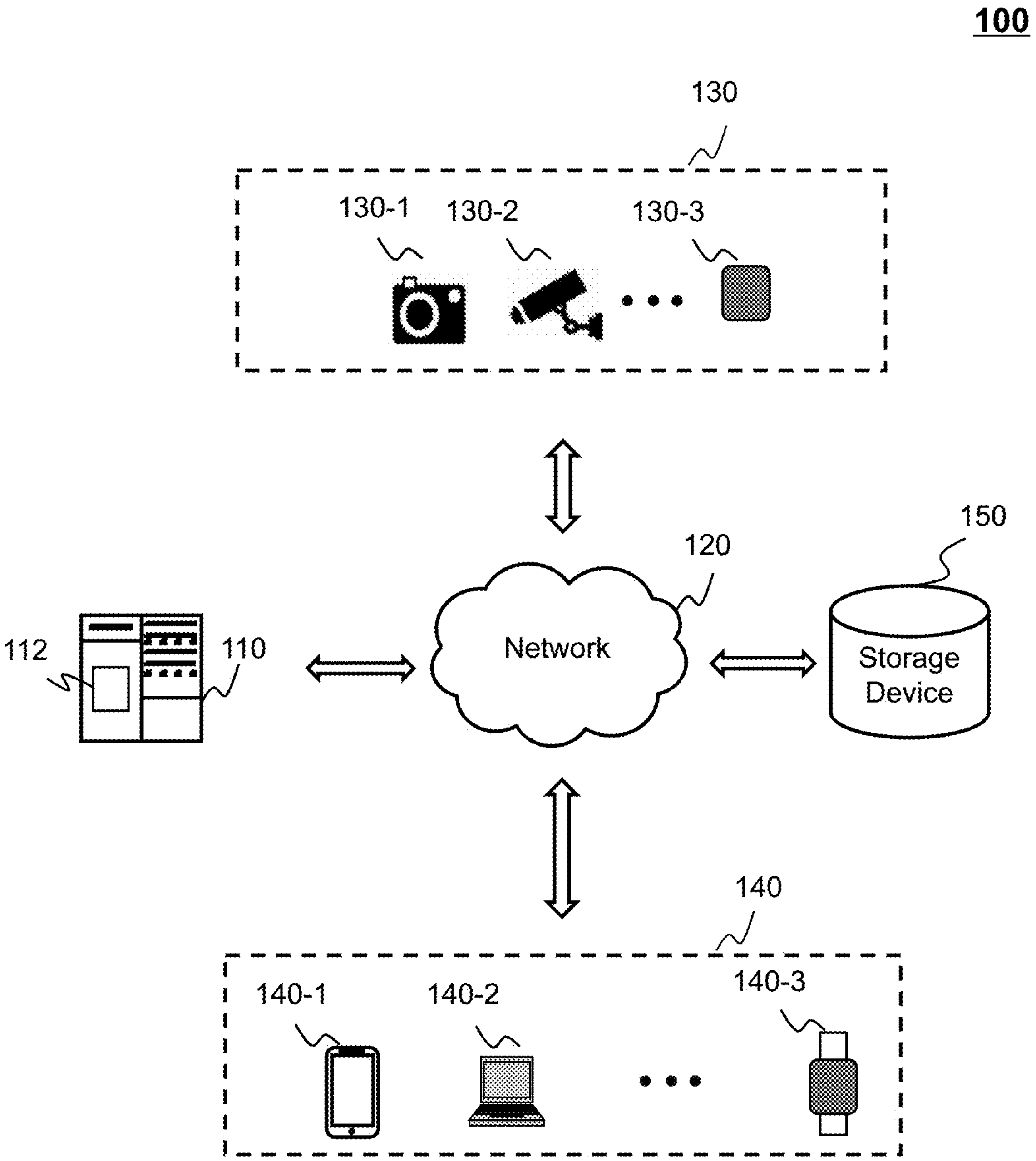
FIG. 1 is a schematic diagram illustrating an exemplary monitoring control system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the terms "system," "engine," "unit," "module," and/or "block" used herein are one method to distinguish different components, elements, parts, sections, or assemblies of different levels in ascending order. However, the terms may be displaced by other expressions if they may achieve the same purpose.

Generally, the words "module," "unit," or "block" used herein, refer to logic embodied in hardware or firmware, or to a collection of software instructions. A module, a unit, or a block described herein may be implemented as software and/or hardware and may be stored in any type of non-transitory computer-readable medium or other storage devices. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 220 illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, an engine, a module, or a block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In addition, it should be understood that in the description of the present disclosure, the terms “first”, “second”, or the like, are only used for the purpose of differentiation, and cannot be interpreted as indicating or implying relative importance, nor can be understood as indicating or implying the order.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

An aspect of the present disclosure relates to systems and methods for monitoring control. The systems may obtain one or more monitoring images (e.g., frames associated with a monitoring video) associated with a monitoring region captured by a monitoring device. The systems may determine whether a target event (e.g., an object appearing in the monitoring region, a fire breaking out, an object displacement, a conflict, an accident) occurs in the monitoring region based on the one or more monitoring images. In response to determining that the target event occurs in the monitoring region, the systems may obtain a target time period (e.g., an overlapping region of exposure rows that are sequentially exposed by a shutter of the monitoring device, a blanking region between two consecutive frames of the monitoring device) associated with operations of a warning light associated with the monitoring device based on at least one parameter of the monitoring device. Further, the systems may control the operations of the warning light based on the target time period. For example, the warning light may be controlled to keep turned on within the target time period and keep turned off outside of the target time. As another example, the warning light may be controlled to flicker within the target time period and keep turned on or off outside of the target time period.

According to the systems and methods of the present disclosure, the operations of the warning light may be controlled based on the target time period, which can ensure that a global brightness of a monitoring screen of the monitoring device would not be affected and a flicker (e.g., change between light and dark) would not appear in the monitoring screen, thereby realizing both the warning function and the supplementary light function.

FIG. 1 is a schematic diagram illustrating an exemplary monitoring control system according to some embodiments of the present disclosure. In some embodiments, the monitoring control system 100 may be applied in various application scenarios, for example, object monitoring, fire monitoring, etc. As shown, the monitoring control system 100 may include a server 110, a network 120, a monitoring device 130, a user device 140, and a storage device 150.

The server 110 may be a single server or a server group. The server group may be centralized or distributed (e.g., the server 110 may be a distributed system). In some embodiments, the server 110 may be local or remote. For example, the server 110 may access information and/or data stored in the monitoring device 130, the user device 140, and/or the storage device 150 via the network 120. As another example, the server 110 may be directly connected to the monitoring device 130, the user device 140, and/or the storage device 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 including one or more components illustrated in FIG. 2 of the present disclosure.

In some embodiments, the server 110 may include a processing device 112. The processing device 112 may process information and/or data relating to monitoring to perform one or more functions described in the present disclosure. For example, the processing device 112 may obtain one or more monitoring images associated with a monitoring region captured by the monitoring device 130. According to the one or more monitoring images, the processing device 112 may determine whether a target event occurs in the monitoring region. In response to determining that the target event occurs in the monitoring region, the processing device 112 may obtain a target time period associated with operations of a warning light associated with the monitoring device 130 based on at least one parameter of the monitoring device 130. Further, the processing device 112 may control the operations of the warning light based on the target time period. In some embodiments, the processing device 112 may include one or more processing devices (e.g., single-core processing device(s) or multi-core processor(s)). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction set computer (RISC), a microprocessor, or the like, or any combination thereof.

In some embodiment, the server 110 may be unnecessary and all or part of the functions of the server 110 may be implemented by other components (e.g., the monitoring device 130, the user device 140) of the monitoring control system 100. For example, the processing device 112 may be integrated into the monitoring device 130 or the user device 140 and the functions (e.g., obtaining a target time period associated with operations of a warning light associated with the monitoring device 130) of the processing device 112 may be implemented by the monitoring device 130 or the user device 140.

The network 120 may facilitate exchange of information and/or data for the monitoring control system 100. In some embodiments, one or more components (e.g., the server 110, the monitoring device 130, the user device 140, the storage device 150) of the monitoring control system 100 may transmit information and/or data to other component(s) of the monitoring control system 100 via the network 120. For example, the server 110 may obtain the one or more monitoring images associated with the monitoring region from the monitoring device 130 via the network 120. As another example, the server 110 may transmit the one or more monitoring images and/or the target event that occurs in the monitoring region to the user device 140 via the network 120. In some embodiments, the network 120 may be any type of wired or wireless network, or combination thereof. Merely by way of example, the network 120 may include a cable network (e.g., a coaxial cable network), a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof.

The monitoring device 130 may be configured to acquire a monitoring image (the "monitoring image" herein refers to a single monitoring image or a frame of a monitoring video). In some embodiments, the monitoring device 130 may include a camera 130-1, a video recorder 130-2, an image sensor 130-3, etc. The camera 130-1 may include a gun camera, a dome camera, an integrated camera, a monocular camera, a binocular camera, a multi-view camera, or the like, or any combination thereof. The video recorder 130-2 may include a PC Digital Video Recorder (DVR), an embedded DVR, or the like, or any combination thereof. The image sensor 130-3 may include a Charge Coupled Device (CCD) image sensor, a Complementary Metal Oxide Semiconductor (CMOS) image sensor, or the like, or any combination thereof. In some embodiments, the monitoring device 130 may include a plurality of components each of which can acquire a monitoring image. For example, the monitoring device 130 may include a plurality of sub-cameras that can capture monitoring images or monitoring videos simultaneously. In some embodiments, the monitoring device 130 may transmit the acquired monitoring image to one or more components (e.g., the server 110, the user device 140, the storage device 150) of the monitoring control system 100 via the network 120.

In some embodiments, the monitoring device 130 may include or may be associated with a warning light (not shown). In some embodiments, when it is determined that a target event occurs in the monitoring region of the monitoring device 140, the warning light may be controlled to keep turned on or to flicker within a target time period (which may be determined based on at least one parameter of the monitoring device 130). In some embodiments, the warning light may include a red and blue warning light, a monochrome warning light, etc.

The user device 140 may be configured to receive information and/or data from the server 110, the monitoring device 130, and/or the storage device 150, via the network 120. For example, the user device 140 may receive the one or more monitoring images associated with the monitoring region from the monitoring device 130. As another example, the user device 140 may receive the target event that occurs in the monitoring region from the server 110. In some embodiments, the user device 140 may process information and/or data received from the server 110, the monitoring device 130, and/or the storage device 150, via the network 120. In some embodiments, the user device 140 may provide a user interface via which a user may view information and/or input data and/or instructions to the monitoring control system 100. For example, the user may view the one or more monitoring images associated with the monitoring region via the user interface. As another example, the user may input an instruction associated with the monitoring control via the user interface. In some embodiments, the user device 140 may include a mobile phone 140-1, a computer 140-2, a wearable device 140-3, or the like, or any combination thereof. In some embodiments, the user device 140 may include a display that can display information in a human-readable form, such as text, image, audio, video, graph, animation, or the like, or any combination thereof. The display of the user device 140 may include a cathode ray tube (CRT) display, a liquid crystal display (LCD), a light-emitting diode (LED) display, a plasma display panel (PDP), a three-dimensional (3D) display, or the like, or a combination thereof.

The storage device 150 may be configured to store data and/or instructions. The data and/or instructions may be obtained from, for example, the server 110, the monitoring device 130, and/or any other component of the monitoring control system 100. In some embodiments, the storage device 150 may store data and/or instructions that the server 110 may execute or use to perform exemplary methods described in the present disclosure. In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components (e.g., the server 110, the monitoring device 130, the user device 140) of the monitoring control system 100. One or more components of the monitoring control system 100 may access the data or instructions stored in the storage device 150 via the network 120. In some embodiments, the storage device 150 may be directly connected to or communicate with one or more components (e.g., the server 110, the monitoring device 130, the user device 140) of the monitoring control system 100. In some embodiments, the storage device 150 may be part of other components of the monitoring control system 100, such as the server 110, the monitoring device 130, or the user device 140.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 2:
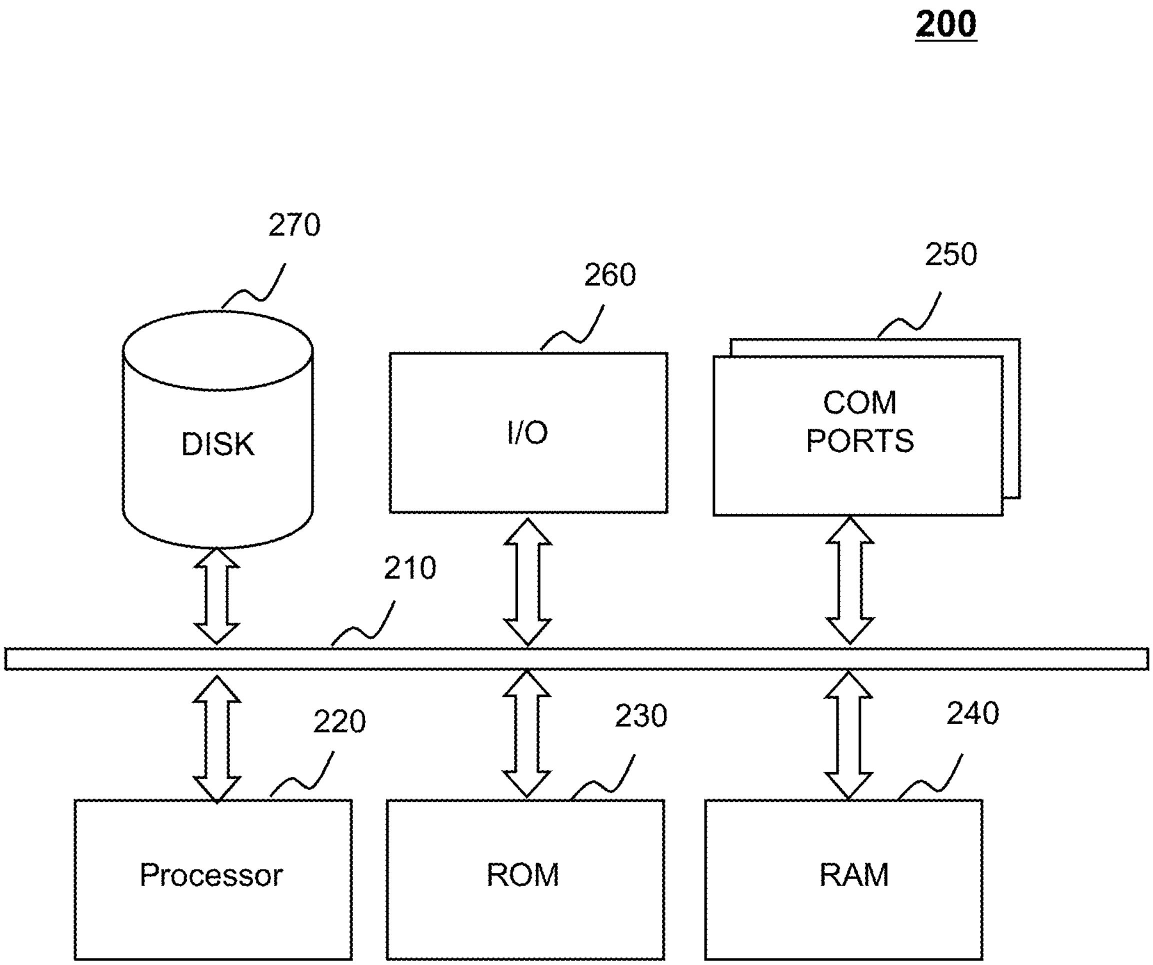
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the server 110 may be implemented on the computing device 200. For example, the processing device 112 may be implemented on the computing device 200 and configured to perform functions of the processing device 112 disclosed in this disclosure.

The computing device 200 may be used to implement any component of the monitoring control system 100 as described herein. For example, the processing device 112 may be implemented on the computing device 200, via its hardware, software program, firmware, or a combination thereof. Although only one such computer is shown, for convenience, the computer functions relating to object measurement as described herein may be implemented in a distributed fashion on a number of similar platforms to distribute the processing load.

The computing device 200, for example, may include COM ports 250 connected to and from a network connected thereto to facilitate data communications. The computing device 200 may also include a processor (e.g., a processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms including, for example, a disk 270, a read-only memory (ROM) 230, or a random-access memory (RAM) 240, for storing various data files to be processed and/or transmitted by the computing device 200. The computing device 200 may also include program instructions stored in the ROM 230, RAM 240, and/or another type of non-transitory storage medium to be executed by the processor 220. The methods and/or processes of the present disclosure may be implemented as the program instructions. The computing device 200 may also include an I/O component 260, supporting input/output between the computing device 200 and other components. The computing device 200 may also receive programming and data via network communications.

Merely for illustration, only one processor is illustrated in FIG. 2. Multiple processors 220 are also contemplated; thus, operations and/or method steps performed by one processor 220 as described in the present disclosure may also be jointly or separately performed by the multiple processors. For example, if in the present disclosure the processor 220 of the computing device 200 executes both step A and step B, it should be understood that step A and step B may also be performed by two different processors 220 jointly or separately in the computing device 200 (e.g., a first processor executes step A and a second processor executes step B, or the first and second processors jointly execute steps A and B).

Figure 3:
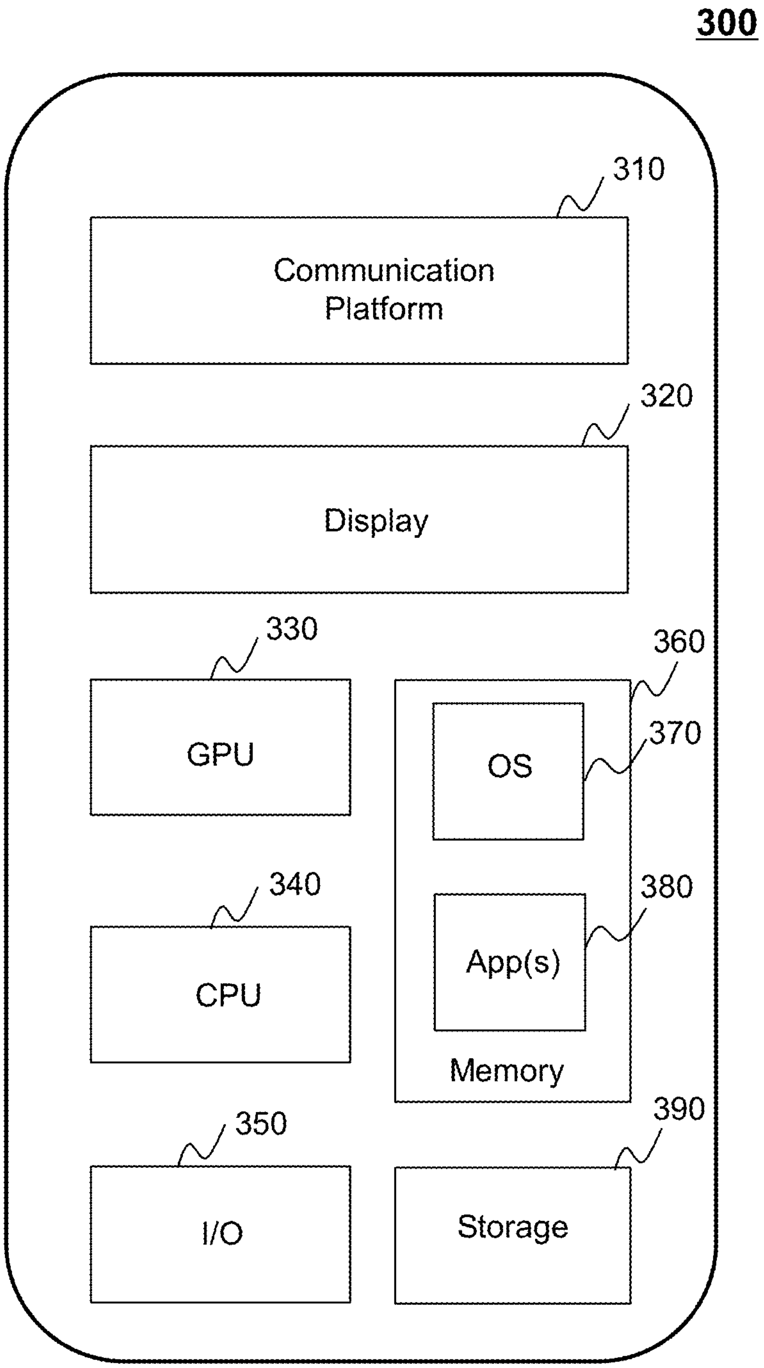
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, the user device 140 may be implemented on the mobile device 300 shown in FIG. 3.

As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300.

In some embodiments, an operating system 370 (e.g., iOS™, Android™, Windows Phone™) and one or more applications (Apps) 380 may be loaded into the memory 360 from the storage 390 in order to be executed by the CPU 340. The applications 380 may include a browser or any other suitable mobile apps for receiving and rendering information relating to monitoring or other information from the processing device 112. User interactions may be achieved via the I/O 350 and provided to the processing device 112 and/or other components of the monitoring control system 100 via the network 120.

Figure 4:
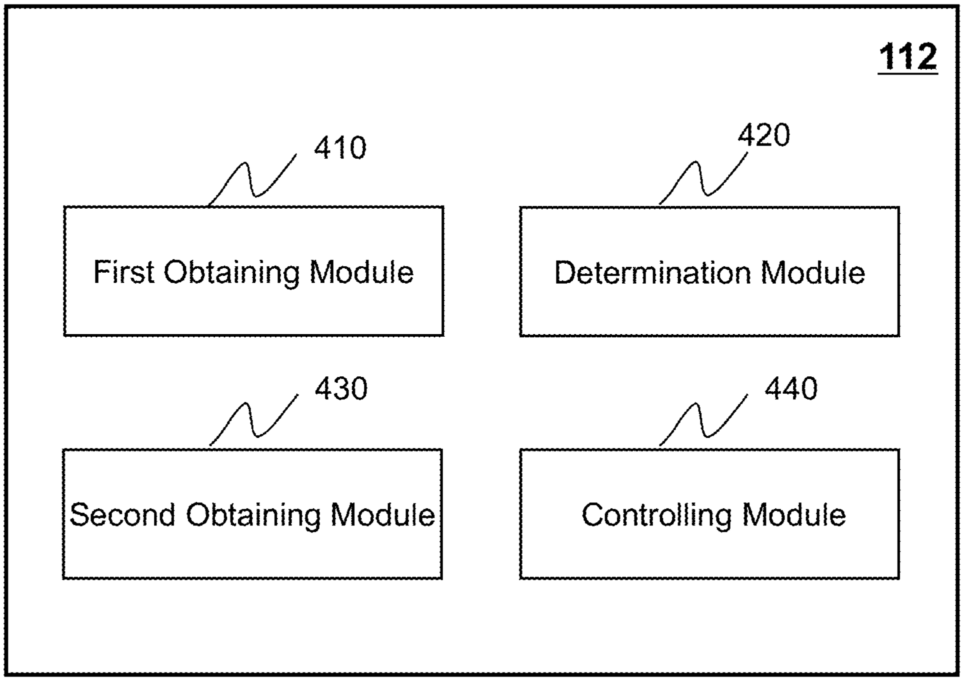
FIG. 4 is a block diagram illustrating an exemplary processing device according to some embodiments of the present disclosure.

FIG. 4 is a block diagram illustrating an exemplary processing device according to some embodiments of the present disclosure. The processing device 112 may include a first obtaining module 410, a determination module 420, a second obtaining module 430, and a controlling module 440.

The first obtaining module 410 may be configured to obtain one or more monitoring images associated with a monitoring region captured by a monitoring device (e.g., the monitoring device 130). More descriptions regarding the obtaining of the one or more monitoring images may be found elsewhere in the present disclosure, for example, operation 510 in FIG. 5 and relevant descriptions thereof.

The determination module 420 may be configured to determine whether a target event occurs in the monitoring region based on the one or more monitoring images. More descriptions regarding the determining of whether the target event occurs in the monitoring region may be found elsewhere in the present disclosure, for example, operation 520 in FIG. 5 and relevant descriptions thereof.

The second obtaining module 430 may be configured to obtain, in response to determining that the target event occurs in the monitoring region, a target time period associated with operations of a warning light associated with the monitoring device based on at least one parameter (also referred to as "exposure parameter") of the monitoring device. More descriptions regarding the obtaining of the target time period may be found elsewhere in the present disclosure, for example, operation 530 in FIG. 5 and relevant descriptions thereof.

The controlling module 440 may be configured to control the operations of the warning light based on the target time period. More descriptions regarding the controlling of the operations of the warning light may be found elsewhere in the present disclosure, for example, operation 540 in FIG. 5 and relevant descriptions thereof.

The modules in the processing device 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. In some embodiments, two or more of the modules may be combined as a single module, and any one of the modules may be divided into two or more units. For example, the first obtaining module 410 and the second obtaining module 430 may be combined as a single module which may both obtain the one or more monitoring images and the target time period. In some embodiments, the processing device 112 may include one or more additional modules. For example, the processing device 112 may also include a transmission module configured to transmit signals (e.g., electrical signals, electromagnetic signals) to one or more components (e.g., the monitoring device 130, the user device 140) of the monitoring control system 100. As another example, the processing device 112 may include a storage module (not shown) used to store information and/or data (e.g., the one or more monitoring images, the target event, the target time period, the at least one parameter of the monitoring device) associated with the monitoring control.

Figure 5:
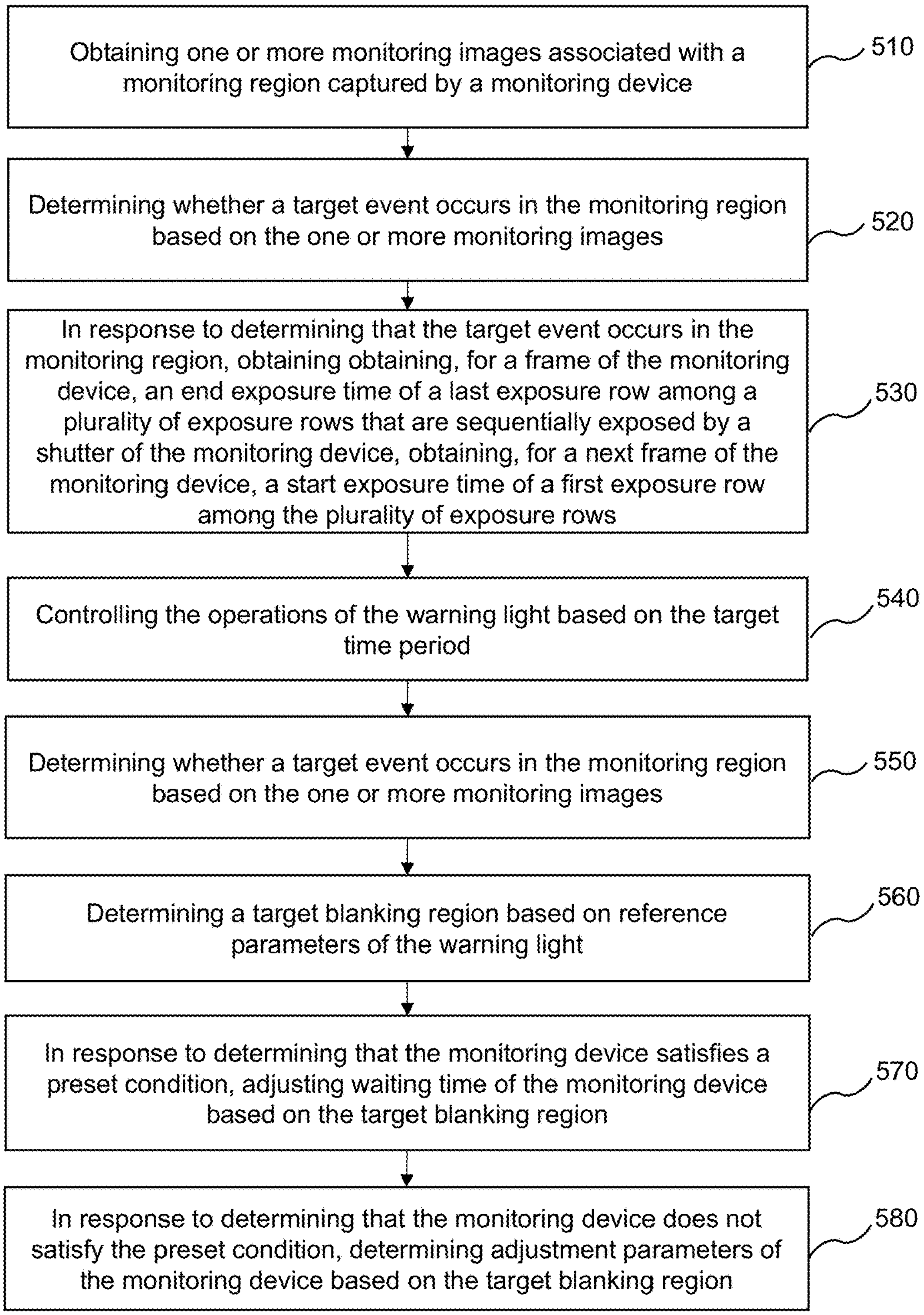
FIG. 5 is a flowchart illustrating an exemplary process for controlling operations of a warning light according to some embodiments of the present disclosure.

FIG. 5 is a flowchart illustrating an exemplary process for controlling operations of a warning light according to some embodiments of the present disclosure. In some embodiments, process 500 may be executed by the monitoring control system 100. For example, the process 500 may be implemented as a set of instructions (e.g., an application) stored in a storage device (e.g., the storage device 150, the ROM 230, the RAM 240, and/or the storage 390). In some embodiments, the processing device 112 (e.g., the processor 220 of the computing device 200, the CPU 340 of the mobile device 300, and/or one or more modules illustrated in FIG. 4) and/or a monitoring control device 1400 (e.g., one or more units illustrated in FIG. 14) illustrated in FIG. 14 may execute the set of instructions and may accordingly be directed to perform the process 500. The operations of the illustrated process presented below are intended to be illustrative. In some embodiments, the process 500 may be accomplished with one or more additional operations not described and/or without one or more of the operations discussed. Additionally, the order of the operations of process 500 illustrated in FIG. 5 and described below is not intended to be limiting.

In 510, the processing device 112 (e.g., the first obtaining module 410 illustrated in FIG. 4) (e.g., the interface circuits of the processor 220) may obtain one or more monitoring images associated with a monitoring region captured by a monitoring device (e.g., the monitoring device 130).

In some embodiments, the processing device 112 may direct the monitoring device 130 to sequentially capture the one or more monitoring images associated with the monitoring region of the monitoring device 130 and obtain the one or more monitoring images accordingly. In some embodiments, the processing device 112 may obtain or determine the one or more monitoring images from a monitoring video associated with the monitoring region captured by the monitoring device 130. For example, the processing device 112 may perform a framing operation on the monitoring video to obtain a plurality of frames in the monitoring video. The processing device 112 may designate one or more consecutive frames in the plurality of frames as the one or more monitoring images.

In some embodiments, the one or more monitoring images associated with the monitoring region may be previously acquired by the monitoring device 130 and stored in a storage device (e.g., the storage device 150, the ROM 230, the RAM 240, and/or the storage 390). The processing device 112 may obtain the one or more monitoring images from the storage device via a network (e.g., the network 120).

In 520, the processing device 112 (e.g., the determination module 420) (e.g., the processing circuits of the processor 220) may determine whether a target event (also referred to as a "preset alarm event") occurs in the monitoring region based on the one or more monitoring images.

The target event may include an object appearing in the monitoring region (e.g., an object entering a monitoring screen of the monitoring device), a fire breaking out, an object displacement, a conflict, an accident, or the like, or any combination thereof. The object may include a biological object and/or a non-biological object. The biological object may include a person, an animal, a plant, or the like, or any combination thereof. The non-biological object may include a natural product (e.g., a stone), an artifact (e.g., an industrial component), or the like, or any combination thereof.

The processing device 112 may determine whether the target event occurs in the monitoring region in real-time. For example, when a monitoring image is obtained, the processing device 112 may determine whether the target event occurs in the monitoring image. If the target event does not occur in the monitoring image, the processing device 112 may obtain a next monitoring image. If the target event occurs in the monitoring image, the processing device 112 may perform operation 530.

In 530, in response to determining that the target event occurs in the monitoring region, the processing device 112 (e.g., the second obtaining module 430) (e.g., the interface/processing circuits of the processor 220) may obtain, for a frame of the monitoring device, an end exposure time of a last exposure row among a plurality of exposure rows that are sequentially exposed by a shutter of the monitoring device.

In some embodiments, the target time period may include a time period (denoted as "time_overlap") (also referred to as a duration of the overlapping region) associated with an overlapping region of exposure rows that are sequentially exposed by a shutter of the monitoring device, a time period (denoted as "time_dummy") (also referred to as a duration of the blanking region) associated with a blanking region between two consecutive frames of the monitoring device, or a portion thereof. In some embodiments, when the monitoring device is a CMOS image sensor and the exposure rows are sequentially exposed by the shutter of the CMOS image sensor, the overlapping region of the exposure rows may refer to an overlap time period during which all exposure rows are exposed at the same time. In some embodiments, when the monitoring device is a CCD image sensor and the exposure rows are exposed by the shutter of the CCD image sensor at the same time, the overlapping region of the exposure rows may refer to an exposure time of the CCD image sensor. More descriptions regarding the overlapping region may be found elsewhere in the present disclosure, for example, FIG. 6 and relevant descriptions thereof. More descriptions regarding the blanking region may be found elsewhere in the present disclosure, for example, FIG. 7 and relevant descriptions thereof.

In some embodiments, the warning light may refer to a light which is integrated into or communicates with the monitoring device and used for supplementary light and/or alert. The operations of the warning light associated with the monitoring device may include keeping turned on, keeping turned off, flicker, etc.

In some embodiments, the at least one parameter of the monitoring device may include frames per second (FPS), a count of the exposure rows that are sequentially exposed by the shutter of the monitoring device, a shutter time, an exposure interval between adjacent exposure rows, a buffer time between adjacent (or consecutive) frames, or the like, or any combination thereof.

In some embodiments, the processing device 112 may determine whether the target time period exists based on the at least one parameter of the monitoring device.

In some embodiments, the processing device 112 may obtain an end exposure time of a first exposure row among a plurality of exposure rows that are sequentially exposed by the shutter of the monitoring device. Further, the processing device 112 may obtain a start exposure time of a last exposure row among the plurality of exposure rows. According to the end exposure time of the first exposure row and the start exposure time of the last exposure row, the processing device 112 may determine whether the target time period exists.

Merely by way of example, if a difference between the end exposure time of the first exposure row and the start exposure time of the last exposure row is larger than 0, the processing device 112 may determine that the target time period exists. If the difference between the end exposure time of the first exposure row and the start exposure time of the last exposure row is less than or equal to 0, the processing device 112 may determine that the target time period does not exist. When the target time period exists, the processing device 112 may directly designate the difference between the end exposure time of the first exposure row and the start exposure time of the last exposure row as the target time period. When the target time period does not exist, the processing device 112 may adjust at least one of the at least one parameter of the monitoring device so that the difference between the end exposure time of the first exposure row and the start exposure time of the last exposure row is larger than 0. According to the at least one adjusted parameter of the monitoring device, the processing device 112 may determine an adjusted end exposure time of the first exposure row and an adjusted start exposure time of the last exposure row. Further, the processing device 112 may determine the difference between the adjusted end exposure time of the first exposure row and the adjusted start exposure time of the last exposure row as the target time period. In such cases, the determined target time period may be the time period associated with the overlapping region of exposure rows. More descriptions regarding the determining or adjustment of the target time period may be found elsewhere in the present disclosure, for example, FIG. 6 and relevant descriptions thereof.

In some embodiments, for a frame of the monitoring device, the processing device 112 may obtain an end exposure time of a last exposure row among the plurality of exposure rows that are sequentially exposed by the shutter of the monitoring device. Further, for a next frame of the monitoring device, the processing device 112 may obtain a start exposure time of a first exposure row among the plurality of exposure rows. According to the end exposure time of the last exposure row corresponding to the frame and the start exposure time of the first exposure row corresponding to the next frame, the processing device 112 may determine whether the target time period exists.

Merely by way of example, if a difference between the end exposure time of the last exposure row corresponding to the frame and the start exposure time of the first exposure row corresponding to the next frame is larger than 0, the processing device 112 may determine that the target time period exists. If the difference between the end exposure time of the last exposure row corresponding to the frame and the start exposure time of the first exposure row corresponding to the next frame is less than or equal to 0, the processing device 112 may determine that the target time period does not exist. When the target time period exists, the processing device 112 may directly designate the difference between the end exposure time of the last exposure row corresponding to the frame and the start exposure time of the first exposure row corresponding to the next frame as the target time period. When the target time period does not exist, the processing device 112 may adjust at least one of the at least one parameter of the monitoring device so that the difference between the end exposure time of the last exposure row corresponding to the frame and the start exposure time of the first exposure row corresponding to the next frame is larger than 0. According to the at least one adjusted parameter of the monitoring device, the processing device 112 may determine an adjusted end exposure time of the last exposure row corresponding to the frame and an adjusted start exposure time of the first exposure row corresponding to the next frame. Further, the processing device 112 may determine the difference between an adjusted end exposure time of the last exposure row corresponding to the frame and the adjusted start exposure time of the first exposure row corresponding to the next frame as the target time period. In such cases, the determined target time period may be the time period associated with the blanking region between the frame and the next frame.

Figure 7:
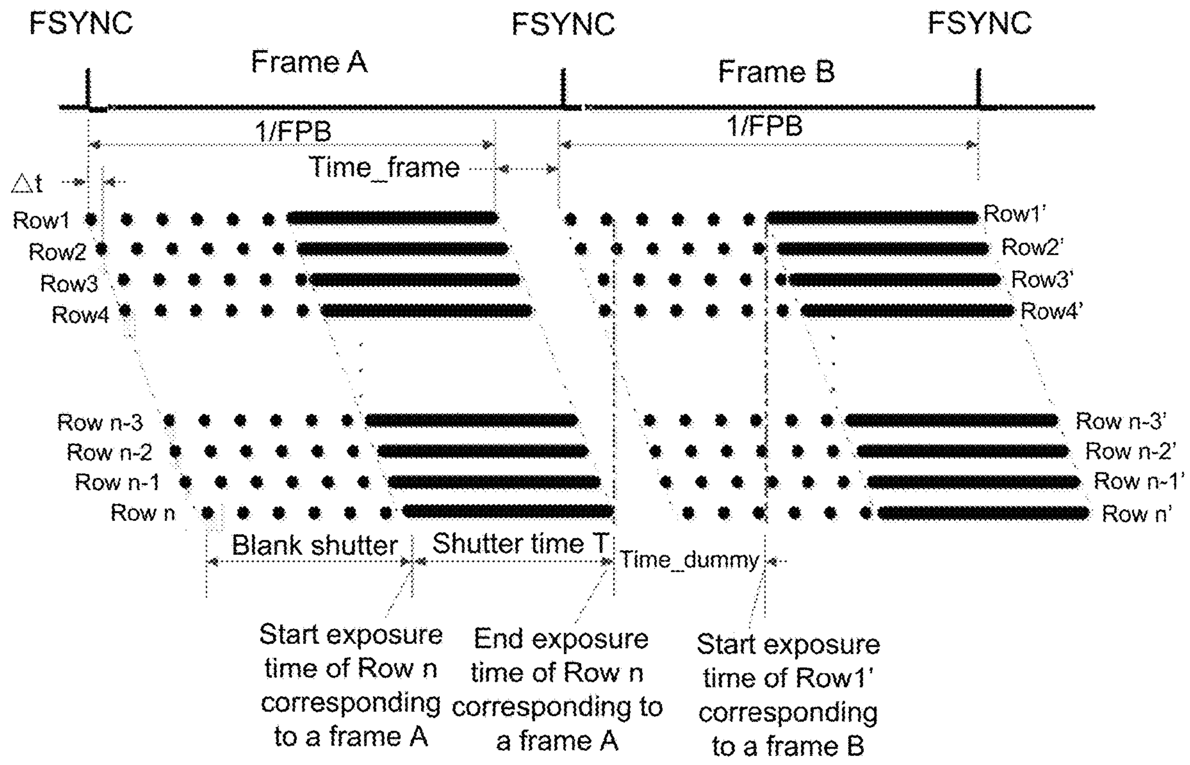
FIG. 7 is a schematic diagram illustrating exemplary exposure rows corresponding to two consecutive frames of a monitoring device according to some embodiments of the present disclosure.

FIG. 7 is a schematic diagram illustrating exemplary exposure rows corresponding to two consecutive frames of a monitoring device according to some embodiments of the present disclosure.

It is also assumed that the monitoring device is the CMOS image sensor and a plurality of frames (e.g., a frame A, a frame B) of the monitoring device may be sequentially exposed by the shutter of the CMOS image sensor, wherein each of the plurality of frames may include a plurality of exposure rows (e.g., Row1, Row2, Row3, Row4, . . . , Row n-3, Row n-2, Row n-1, and Row n corresponding to the frame A; Row1', Row2', Row3', Row4', . . . , Row n-3', Row n-2', Row n-1', and Row n' corresponding to the frame B). As illustrated in FIG. 7, the exposure interval between adjacent exposure rows may also be denoted as Δt. A time (i.e., 1/FPS) for the monitoring device to capture one frame (e.g., the frame A, the frame B) may include a blank shutter time and a shutter time T. For example, when the FPS is 25 HZ, the time for the monitoring device to capture one frame may be 1/25 s (i.e., 40 ms). If the shutter time T is 20 ms, the blank shutter time may be (40-20) ms. FSYNC may be a start signal of a frame (e.g., the frame A, the frame B), which may indicate a start exposure time of the frame. A buffer time between adjacent frames (e.g., the frame A and the frame B) may be denoted as time_frame.

In 540, determining a target time period associated with operations of a warning light associated with the monitoring device based on the end exposure time of the last exposure row corresponding to the frame and the start exposure time of the first exposure row corresponding to the next frame.

It is assumed that the start exposure time of the frame A is 0, accordingly, a start exposure time of the first exposure Row1 corresponding to the frame A is 1/FPS-T, a start exposure time of the last exposure Row n corresponding to the frame A is (1/FPS−T)+(n−1)*Δt, an end exposure time of the last exposure Row n corresponding to the frame A is (1/FPS−T)+(n−1)*Δt+T (i.e., 1/FPS+(n−1)*Δt), and a start exposure time of the first exposure Row1' corresponding to the frame B is (1/FPS+time_frame)+(1/FPS−T). It can be seen that the start exposure time of the first exposure Row1' corresponding to the frame B is later than the end exposure time of the last exposure Row n corresponding to the frame A, accordingly, a difference between the start exposure time of the first exposure Row1' corresponding to the frame B and the end exposure time of the last exposure Row n corresponding to the frame A is ((1/FPS+time_frame)+(1/FPS−T)−(1/FPS+(n−1)*Δt) (i.e., (1/FPS+time_frame)−(n−1)*Δt+T), which may be a time period (denoted as time_dummy) associated with a blanking region between the frame A and the frame B. During the time period associated with the blanking region, no frame is captured, that is, a brightness of the warning light does not affect the brightness of the monitoring screen. Accordingly, using this time period as the target time period in which the warning light is controlled to flicker and outside of which the warning light is controlled to keep turned on or turned off (or some other control manners described elsewhere in the present disclosure) can ensure that the global brightness of the monitoring screen would not be affected and a flicker would not appear in the monitoring screen, thereby realizing both the warning function and the supplementary light function.

In some embodiments, if the start exposure time of the first exposure Row1' corresponding to the frame B is earlier than the end exposure time of the last exposure Row n corresponding to the frame A, that is, the difference between the start exposure time of the first exposure Row1' corresponding to the frame B and the end exposure time of the last exposure Row n corresponding to the frame A is less than or equal to 0, the processing device 112 may determine that the target time period does not exist. In this situation, the processing device 112 may adjust the at least one parameter (e.g., FPS, a count (i.e., n) of the plurality of exposure rows, the exposure interval Δt between adjacent exposure rows, the buffer time (time_frame) between adjacent frames, the shutter time T) of the monitoring device to make the target time period exists or adjust the target time period. For example, the processing device 112 may reduce the shutter time T to increase the target time period so that the target time period is larger than or equal to a certain flicker time that the flicker of the warning light needs. As another example, the processing device 112 may reduce the FPS and/or the exposure interval Δt to make the target time period exists. As a further example, the processing device 112 may reduce the shutter time T and/or the FPS to increase the target time period.

In some situations, the reduction of the shutter time T may cause a limited performance of the monitoring device. For example, in the case of low ambient brightness, when the shutter time T is reduced, a brightness detected by the monitoring device may be reduced, which may reduce a brightness of a monitoring screen of the monitoring device and result in unclarity of objects in the monitoring screen. Accordingly, in some embodiments, in addition to the warning light, the monitoring device may also include a fill light used to supplement light. When the shutter time T is reduced, the processing device 112 may increase a brightness and/or an exposure gain value of the fill light so that the monitoring device may receive sufficient brightness. Accordingly, in the case of low ambient brightness, the brightness of the monitoring screen will not be affected by the reduction of the shutter time T.

In some embodiments, the target time period may be previously determined and stored in the storage device (e.g., the storage device 150, the ROM 230, the RAM 240, and/or the storage 390). The processing device 112 may obtain the target time period from the storage device via a network (e.g., the network 120).

In 550, the processing device 112 (e.g., the controlling module 440) (e.g., the processing circuits of the processor 220) may control the operations of the warning light based on the target time period.

In some embodiments, when the target time period is the time period associated with the overlapping region of exposure rows that are sequentially exposed by the shutter of the monitoring device, the processing device 112 may control the warning light to keep turned on within the target time period and to keep turned off outside of the target time period, so as to realize a flicker of the warning light (i.e., realize a warning function). More descriptions regarding the controlling of the warning light may be found elsewhere in the present disclosure, for example, operation 820 in FIG. 8 and relevant descriptions thereof.

In some embodiments, when controlling the operations of the warning light, the processing device 112 may determine whether the warning light associated with the monitoring device is turned on (which indicates whether an environmental brightness meets monitoring requirements). In response to determining that the warning light associated with the monitoring device is turned on (which indicates that the environmental brightness is relatively low and the warning light is used for supplementary light), the processing device 112 may increase a power consumption of the warning light in the target time period (which can ensure that brightness can meet monitoring requirements) based at least in part on the at least one parameter of the monitoring device and the target time period. Further, the processing device 112 may control the warning light to keep turned on under the increased power consumption within the target time period. More descriptions regarding the determining of the increased power consumption may be found elsewhere in the present disclosure, for example, operations 1040 and 1050 in FIG. 10 and relevant descriptions thereof.

In some embodiments, when the target time period is the time period associated with the blanking region between two consecutive frames of the monitoring device, the processing device 112 may control the warning light to flicker within the target time period and to keep turned on outside of the target time period (when the environmental brightness is relatively low). In some embodiments, the processing device 112 may control the warning light to keep turned on within the target time period and to keep turned off outside of the target time period (when the environmental brightness is relatively high and no supplementary light is needed), so as to realize a flicker of the warning light (i.e., realize a warning function). In some embodiments, the processing device 112 may control the warning light to flicker within the target time period and to keep turned off outside of the target time period (when the environmental brightness is relatively high and no supplementary light is needed). In some embodiments, the processing device 112 may control the warning light to keep turned off within the target time period and to keep turned on outside of the target time period (when the environmental brightness is relatively low), so as to realize a flicker of the warning light (i.e., realize a warning function). More descriptions regarding the controlling of the warning light may be found elsewhere in the present disclosure, for example, operation 1120 in FIG. 11, operation 1230 in FIG. 12, and relevant descriptions thereof.

In some embodiments, during the operations (e.g., the flicker of the warning light) of the warning light, a monitoring screen of the monitoring device would not change obviously between light and dark. Specifically, when a brightness of a monitoring environment of the monitoring device is relatively stable (e.g., there is no change obviously in the brightness of the environment), an absolute value of a brightness difference between frames obtained by the monitoring device during the operations (e.g., the flicker of the warning light) of the warning light may be less than or equal to a threshold. The threshold may be a default setting of the monitoring control system 100 or may be adjustable under different situations. In some embodiments, the threshold may be an empirical value. In some embodiments, the threshold may be set according to a perception of the brightness of an image by a naked eye of ordinary people. In some embodiments, the threshold may be previously determined and stored in a storage device (e.g., the storage device 150, the ROM 230, the RAM 240, and/or the storage 390). The processing device 112 may obtain the threshold from the storage device via a network (e.g., the network 120).

In some embodiments, the processing device 112 may adjust, based on reference parameters of the warning light, the target time period by adjusting the at least one parameter of the monitoring device; and control the operations of the warning light based on the adjusted target time period. In some embodiments, the reference parameters of the warning light may include a type of the warning light, a duty ratio of the warming light, a flicker frequency of the warning light, a high level duration and a low level duration of the flicker of the warning light, or the like, or any combination thereof. Merely by way of example, for each of the operations of the warning light, the processing device 112 may determine a required time based on the reference parameters of the warning light. Then the processing device 112 may determine a required target time period based on at least one of the required times corresponding to the operations of the warning light. For example, the processing device 112 may designate a required time for the warning light to keep turned on during one flicker as the required target time period. Further, the processing device 112 may adjust the at least one parameter of the monitoring device to adjust target time period to satisfy the required target time period. More descriptions regarding the adjustment of the target time period based on the reference parameters of the warning light may be found elsewhere in the present disclosure, for example, FIG. 10 and relevant descriptions thereof.

In some embodiments, the processing device 112 may determine whether the target event disappears in the monitoring region based on the one or more monitoring images. In response to determining that the target event disappears in the monitoring region, the processing device 112 may restore the adjusted at least one parameter of the monitoring device. In some embodiments, in response to determining that the target event disappears in the monitoring region, the processing device 112 may also restore operational parameters of the warning light. For example, if the power consumption of the warning light is increased during controlling the operations of the warning light, the processing device 112 may restore the power consumption of the warning light, which can avoid heating and poor performance of the warning light caused by excessive power consumption.

In 560, the processing device 112 (e.g., the controlling module 440) (e.g., the processing circuits of the processor 220) may determine a target blanking region based on reference parameters of the warning light.

In some embodiments, the processing device 112 may determine the target blanking region based on the reference parameters of the warning light. In response to determining that the monitoring device satisfies the preset condition, the processing device 112 may adjust waiting time of the monitoring device based on the target blanking region. In response to determining that the monitoring device does not satisfy the preset condition, the processing device 112 may determine adjustment parameters of the monitoring device based on the target blanking region. More descriptions of the reference parameters may be found in FIG. 10 and its related descriptions.

The target blanking region refers to a blanking region that is currently needed. The blanking region refers to a time period when there is no valid image data between two consecutive frames in an image acquisition process of the monitoring device. In the blanking region, the monitoring device does not capture any image data, so that a brightness changes during a time period corresponding to the blanking region does not affect a final image quality.

In some embodiments, the reference parameters of the warning light may also include a type of the warning light.

In some embodiments, the processing device 112 may obtain a flicker cycle of the warning light from the storage device based on the type of the warning light and adjust the target blanking region to be greater than the flicker cycle. The flicker cycle refers to time required for the warning light to complete a single flicker. The flicker refers to the warning light turning on, turning off, and then turning on again.

In some embodiments, the processing device 112 may also determine the target blanking region based on a type of the target event and morphological change characteristics of the target event.

In some embodiments, the type of the target event may include at least one of a presence of an object, a fire outbreak, an object displacement, a conflict, an accident, or the like in the monitoring region.

The morphological change characteristics of the target event refer to data characterizing changes in the target event that occur during a preset time period. In some embodiments, different types of target events correspond to different morphological change characteristics. For example, if the type of the target event is a presence of an object or a person in the monitoring region, the morphological change characteristics may include a movement speed of the object or a walking speed of the person, etc., during the preset time period. For example, if the type of the target event is a fire outbreak, the morphological change characteristics may include a trend, a size, a color change, etc., of a flame during the preset time period. The preset time period is pre-set based on historical experience.

In some embodiments, the processing device 112 may obtain the type of the target event and the morphological change characteristics of the target event based on image data including the target event through image recognition techniques such as image extraction, template matching, support vector machines (SVMs), or the like.

In some embodiments, the processing device 112 may obtaining an influence value corresponding to the type and the morphological change characteristics of the target event by querying an influence value table based on the type and the morphological change characteristics of the target event, and determine the target blanking region based on the influence value. The larger the influence value is, the larger the target blanking region is.

In some embodiments, the influence value table may be pre-set based on historical experience, including a plurality of sets of types and morphological change characteristics of the target events and influence values corresponding to each set of the types and the morphological change characteristics of the target events. The influence value refers to a value that characterizes an importance of the target event, and the larger the influence value, the more important the target event.

It should be understood that, important target events may need the warning light to flicker in a plurality of flicker modes to enable the monitoring device to capture richer information, and therefore a larger blanking region is required to allow the monitoring device to switch to different flicker mode flexibly.

In some embodiments of the present disclosure, a degree of importance of the target event can be reasonably assessed based on the type and the morphological change characteristics of the target event, and a more appropriate target blanking region can be determined based on the degree of importance.

In 570, in response to determining that the monitoring device satisfies a preset condition, the processing device 112 (e.g., the controlling module 440) (e.g., the processing circuits of the processor 220) may adjust waiting time of the monitoring device based on the target blanking region.

In some embodiments, the preset condition include that the monitoring device may steplessly adjust parameters. Steplessly adjusting refers to continuously and smoothly adjusting the waiting time within a preset range.

In some embodiments, in response to determining that the monitoring device satisfies the preset condition, the processing device 112 may adjust the waiting time of the monitoring device based on the target blanking region. For example, in response to determining that the monitoring device satisfies the preset condition, the processing device 112 may adjust the waiting time of the monitoring device based on the target blanking region (e.g., adjusting the waiting time through steplessly adjustment within a preset time range, etc.). The preset time range may be a preset adjustment range of the waiting time.

Merely by way of example, the processing device 112 may adjust the waiting time Δt of the monitoring device based on the target blanking region according to an equation (3) below:

$$\text{time}_{dummy} = \frac{1}{fps} + \text{time}_{frame} - ((n-1)*\Delta t + \text{shutter}), \tag{3}$$

wherein $\text{time}_{dummy}$ refers to the blanking region, $\text{time}_{frame}$ refers to the buffer time between the adjacent (or consecutive) frames, (n−1)*Δt refers to the start exposure time of the last exposure row n, shutter refers to the shutter time, and fps refers to the FPS. The processing device 112 may adjust the waiting time Δt to obtain the target blanking region.

The adjustment parameters refer to parameters obtained by adjusting at least one of current parameters of the monitoring device. In some embodiments, the adjustment parameters may include at least one of the FPS and the shutter time of the monitoring device.

In 580, in response to determining that the monitoring device does not satisfy the preset condition, the processing device 112 (e.g., the controlling module 440) (e.g., the processing circuits of the processor 220) may determine, based on said target (e.g., the processing circuits of the processor 220) may determine adjustment parameters of the monitoring device based on the target blanking region.

In some embodiments, the current parameters of the monitoring device include the FPS, the shutter time, the exposure interval (also referred to as waiting time) between the adjacent exposure rows, the buffer time between the adjacent (or consecutive) frames, or the like.

In some embodiments, in response to determining that the monitoring device does not satisfy the preset condition, the processing device 112 may determine the adjustment parameters of the monitoring device based on the target blanking region. For example, in response to determining that the monitoring device does not satisfy the preset condition, the processing device 112 may adjust at least one of the current parameters of the monitoring device based on the target blanking region, so that the blanking region is the same as the target blanking region. The adjusted parameters are the adjustment parameters.

In some embodiments, the processing device 112 may adjust at least one of the current parameters of the monitoring device based on the equation (3) above. For example, the processing device 112 may set the first exposure row, the buffer time between the adjacent (or consecutive) frames, and the waiting time to fixed values, and adjust the FPS and/or the shutter time so that the blanking region is the same as the target blanking region.

In some embodiments, the processor may randomly adjust the FPS and/or the shutter time within a preset FPS range and a preset shutter time range. For example, the processing device 112 does not adjust the shutter time, and adjusts the FPS within the preset FPS range. As another example, the processing device 112 does not adjust the FPS, and adjusts the shutter time within the preset shutter time range. As a further example, the processing device 112 may adjust the FPS and the shutter time both within the preset FPS range and the preset shutter time range, etc.

In some embodiments of the present disclosure, determining the adjustment parameters of the monitoring device based on the target blanking region allows adjusting parameters of the monitoring device to satisfy a demand for image acquisition. At the same time, the parameters of the monitoring device can be adjusted by adjusting the waiting time or the FPS and/or the shutter time, which improves a flexibility of determining the adjustment parameters.

In some embodiments, in response to determining that the monitoring device does not satisfy the preset condition, the processing device 112 may determine the adjustment parameters based on the target blanking region and environmental characteristics. For example, the processing device 112 may adjust the FPS and/or the shutter time at least once to obtain at least one set of adjustment parameters based on the target blanking region by the manner of adjusting the FPS and/or the shutter time described above. The processing device 112 may select a set of adjustment parameters from the at least one set of adjustment parameters as a current set of adjustment parameters based on the environmental characteristics.

The environmental characteristics refer to data related to an environment in which the monitoring device is located. In some embodiments, the environmental characteristics may include ambient light intensity. In some embodiments, the processing device 112 may obtain the environmental characteristics via light sensors deployed on the monitoring device.

In some embodiments, the processing device 112 may select a set of candidate adjustment parameters from at least one set of candidate adjustment parameters as the adjustment parameters based on the ambient light intensity. For example, in response to determining that the ambient light intensity is not less than a first light intensity threshold, the processing device 112 may select adjustment parameters with the smallest adjustment magnitude of the FPS from the at least one set of adjustment parameters as the current adjustment parameters. As another example, in response to determining that the ambient light intensity is not greater than a second light intensity threshold, the processing device 112 may select adjustment parameters with the smallest adjustment amplitude of the shutter time from the at least one set of adjustment parameters as the current adjustment parameters. As a further example, in response to determining that the ambient light intensity is less than the first light intensity threshold and greater than the second light intensity threshold, the processing device 112 may randomly select a set of adjustment parameters from the at least one set of adjustment parameters as the current adjustment parameters. The first light intensity threshold and the second light intensity threshold are pre-set based on historical experience, and the first light intensity threshold is greater than the second light intensity threshold.

It should be understood that, adjusting the shutter time has less influence on a quality of the captured image in a brighter environment, so candidate adjustment parameters that adjust the FPS is chosen as the adjustment parameters.

In some embodiments of the present disclosure, based on the light intensity of the environment in which the monitoring device is located, a way that minimizes the influence on the image quality can be selected from two ways of adjusting the parameters of the monitoring device, namely, adjusting the FPS or the shutter time, which is conducive to the monitoring device to subsequently acquire high-quality images.

In some embodiments, in response to determining that the monitoring device does not satisfy the preset condition, the processing device 112 may determine at least one set of candidate adjustment parameters based on the target blanking region, determine at least one energy consumption value corresponding to the at least one set of candidate adjustment parameters, and determine the adjustment parameters based on the at least one energy consumption value. The candidate adjustment parameters refer to adjustment parameters need to be determined.

In some embodiments, the processing device 112 may filter out, based on the target blanking region, at least one set of historical adjustment parameters in the target blanking region from historical data as the at least one set of candidate adjustment parameters. The historical adjustment parameters refer to adjustment parameters used in a historical process of adjusting the parameters of the monitoring device. The at least one set of historical adjustment parameters may include at least one set of historical adjustment parameters that have been used more than a threshold count of times. The threshold count of times may be pre-set based on historical experience.

The energy consumption value refers to an estimated energy consumption of the monitoring device when adjusting based on the candidate adjustment parameters. In some embodiments, since the shutter time is short, it has no effect on the energy consumption of the monitoring device, and the higher the FPS in the candidate adjustment parameters, the higher the energy consumption value corresponding to the candidate adjustment parameters. A set of candidate adjustment parameters corresponds to an energy consumption value.

In some embodiments, the processing device 112 may take candidate adjustment parameters whose energy consumption value satisfies a filtering condition among the at least one set of candidate adjustment parameters as the adjustment parameters. The filtering condition includes that the energy consumption value is the minimum, etc.

In some embodiments of the present disclosure, by determining the energy consumption values of the candidate adjustment parameters and filtering the candidate adjustment parameters based on the energy consumption values, adjustment parameters with lowest energy consumption can be determined, thereby reducing an energy consumption of adjusting parameters of the monitoring device.

In some embodiments, for each set of candidate adjustment parameters in the at least one set of candidate adjustment parameters, the processing device 112 may determine a first score based on the each set of candidate adjustment parameters, the target blanking region, and the type of the target event, determine a second score based on the each set of candidate adjustment parameters, the target blanking region, and morphological change characteristics of the target event, determine a comprehensive evaluation value based on the first score and the second score, and determine the adjustment parameters based on at least one comprehensive evaluation value corresponding to the at least one set of candidate adjustment parameters.

In some embodiments, the processing device 112 may further determine the adjustment parameters based on the at least one comprehensive evaluation value corresponding to the at least one set of candidate adjustment parameters. For example, the processing device 112 may determine candidate adjustment parameters with the highest comprehensive evaluation value in the at least one set of candidate adjustment parameters as the adjustment parameters.

The comprehensive evaluation value refers to data obtained by conduct a comprehensive evaluation on the candidate adjustment parameters. In some embodiments, the processing device 112 may determine a comprehensive evaluation value corresponding to the each set of candidate adjustment parameters based on a first score and a second score of the each set of candidate adjustment parameters of the at least one set of candidate adjustment parameters. For example, the processing device 112 may use a weighted sum of the first score and the second score of the each set of candidate adjustment parameters as the comprehensive evaluation value. Weights of the first score and the second score are pre-set based on historical experience.

In some embodiments, for the each set of candidate adjustment parameters in the at least one set of candidate adjustment parameters, the processing device 112 may determine a first score corresponding to the each set of candidate adjustment parameters based on the each set of candidate adjustment parameters, the target blanking region, and the type of the target event. The processing device 112 may also determine a second score corresponding to the each set of candidate adjustment parameters based on the each set of candidate adjustment parameters, the target blanking region, and the morphological change characteristics of the target event.

In some embodiments, the processing device 112 may determine the first score corresponding to the each set of candidate adjustment parameters based on the each set of candidate adjustment parameters, the target blanking region, and the type of the target event using a first score model.

In some embodiments, the first score model may be a machine learning model. For example, the first score model may include any one or a combination of a Convolutional Neural Networks (CNN) model, a Neural Networks (NN) model, or other customized model structure, etc.

In some embodiments, the processing device 112 may train the first score model based on a large count of first training samples with first labels in a gradient descent manner, etc. Each set of training samples of the first training samples may include a sample target blanking region, sample candidate adjustment parameters, and a type of a sample target event, and the first label of the first training sample may be a first score corresponding to the sample candidate adjustment parameters. In some embodiments, the first training samples may be obtained based on historical data.

In some embodiments, the processing device 112 may determine the first label based on experimental data. An experimental process includes: causing the monitoring device to perform, based on the sample target blanking region and the sample candidate adjustment parameters, image acquisition on the sample target event to obtain a plurality of images. The processing device 112 evaluates a count of images in the plurality of images that satisfy an image acquisition requirement, and a ratio of the count of images that satisfy the image acquisition requirement to a total count of the plurality of images is used as the first label.

In some embodiments, the first score model may be obtained by a training process including: inputting a plurality of training samples with first labels into an initial first score model, constructing a loss function based on the first labels and prediction results of the initial first score model, iteratively updating the initial first score model based on the loss function, and when the loss function of the initial first score model satisfies a preset condition, terminating the training process of the first score model. The preset condition may be that the loss function converges, a count of iterations reaches a set value, etc.

In some embodiments, the processing device 112 may determine the second score corresponding to the each set of candidate adjustment parameters based on the each set of candidate adjustment parameters, the target blanking region, and the morphological change characteristics of the target event using a second score model.

In some embodiments, the processing device 112 may normalize the morphological change characteristics of the target event to facilitate subsequent determination of the second score based on the morphological change characteristics.

In some embodiments, the second score model may be a machine learning model. For example, the second score model may include any one or a combination of a Convolutional Neural Networks (CNN) model, a Neural Networks (NN) model, or other customized model structure, etc.

In some embodiments, the processing device 112 may train the second score model based on a large count of second training samples with second labels in the gradient descent manner, etc. Each set of training samples of the second training samples may include the sample target blanking region, the sample candidate adjustment parameters, and sample morphological change characteristics of the sample target event during a sample time period, and the second label of the second training sample may be a second score corresponding to the sample candidate adjustment parameters. The sample time period is a preset time period for training. In some embodiments, the second training samples may be obtained based on historical data.

In some embodiments, the processing device 112 may determine second labels based on experimental data. An experimental process includes: causing the monitoring device to perform, based on the sample target blanking region and the sample candidate adjustment parameters, image acquisition on the sample target event during the sample time period to obtain a plurality of images, and the processing device 112 evaluates the plurality of images to obtain morphological change characteristics corresponding to the experimental process. The processing device 112 may use a ratio of a preset threshold count of times to a count of times accidents that occurred in an acquisition process during the sample time period as the second label. The accidents that occurred during the sample time period include missing image data, equipment malfunctions, a difference between a morphological change characteristics corresponding to the experimental process and sample morphological change characteristics, etc. The difference between a morphological change characteristics corresponding to the experimental process and the sample morphological change characteristics includes that the movement speed of the object in the sample time period is different from a movement speed in the sample morphological change characteristics, or the trend of the flame in the sample time period is different from a trend in the sample morphological change characteristics, or the like.

In some embodiments, a training process of the second score model is similar to a training process of the first score model, which can be found in the training process of the first score model.

In some embodiments, the processing device 112 may determine the comprehensive evaluation value based on the first score, the second score, and the energy consumption value corresponding to the each set of candidate adjustment parameters. For example, the processing device 112 may weight and sum the first score, the second score, and the energy consumption value corresponding to the each set of candidate adjustment parameters to obtain the comprehensive evaluation value. Weights of the first score, the second score, and the energy consumption value are pre-set based on historical experience.

In some embodiments of the present disclosure, the energy consumption value corresponding to the candidate adjustment parameters is considered when determining the comprehensive evaluation value, so that a more exhaustive comprehensive evaluation value can be determined.

In some embodiments of the present disclosure, by comprehensively evaluating the candidate adjustment parameters, better candidate adjustment parameters can be determined as the adjustment parameters, which facilitates the subsequent adjustment of the parameters of the monitoring device based on the adjustment parameters, so that image data acquired by the monitoring device has better quality.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations (e.g., a storing operation, a transmitting operation) may be added elsewhere in the process 500. In the storing operation, the processing device 112 may store information and/or data (e.g., the one or more monitoring images, the target event, the target time period, the at least one parameter of the monitoring device) associated with the monitoring control in a storage device (e.g., the storage device 150, the storage 220, the storage 390) disclosed elsewhere in the present disclosure. In the transmitting operation, the processing device 112 may transmit the one or more monitoring images and/or the target event that occurs in the monitoring region to the user device 140. As another example, operation 510 and operation 520 may be combined into a single operation in which the processing device 112 may obtain the one or more monitoring images and determine whether the target event occurs in the monitoring region.

Figure 6:
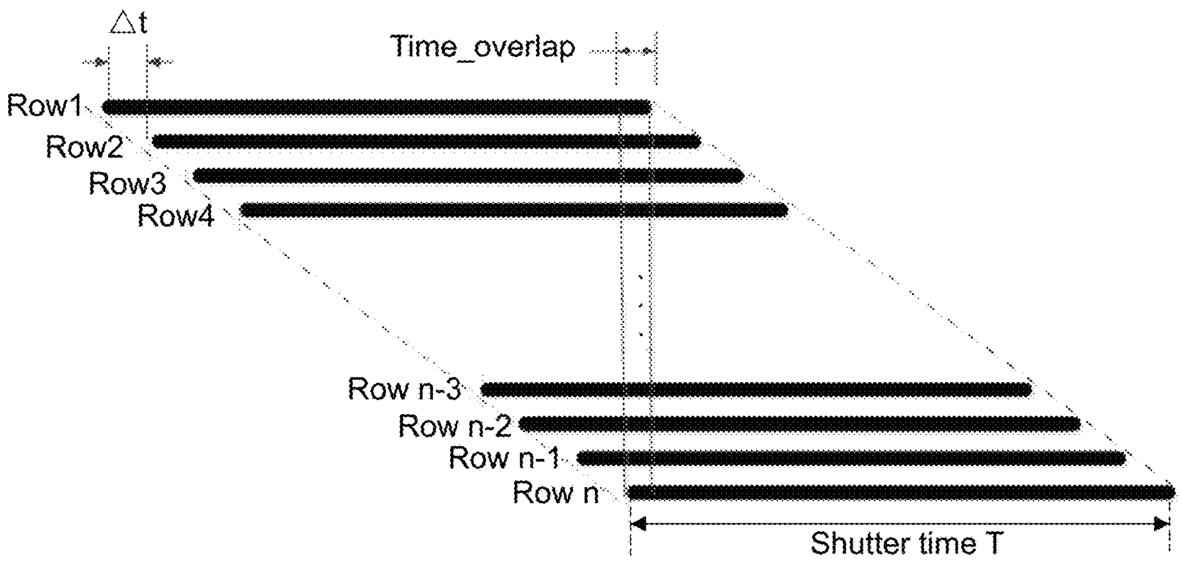
FIG. 6 is a schematic diagram illustrating exemplary exposure rows corresponding to a frame of a monitoring device according to some embodiments of the present disclosure.

FIG. 6 is a schematic diagram illustrating exemplary exposure rows corresponding to a frame of a monitoring device according to some embodiments of the present disclosure.

It is assumed that the monitoring device is a CMOS image sensor and a plurality of exposure rows (e.g., Row1, Row2, Row3, Row4, . . . , Row n-3, Row n-2, Row n-1, and Row n) may be sequentially exposed by a shutter of the CMOS image sensor. As illustrated in FIG. 6, an exposure interval between adjacent exposure rows is denoted as $\Delta t$. A first exposure Row1 is exposed first; after the first exposure Row1 is exposed for $\Delta t$, a second exposure Row2 is exposed; . . . , a last exposure Row n is exposed lastly.

It is assumed that a start exposure time of the first exposure Row1 is 0, accordingly, a start exposure time of the second exposure Row2 is Δt, a start exposure time of a third exposure Row3 is 2*Δt, . . . , a start exposure time of the last exposure Row n is (n−1)*Δt. It can be seen that the start exposure time of the last exposure Row n and the start exposure time of the first exposure Row1 for (n−1)*Δt are within a same shutter time T (which may be equal to an exposure duration of each exposure row) of the monitoring device, accordingly, a difference between the end exposure time of the first exposure Row1 and the start exposure time of the last exposure Row n is T−(n−1)*Δt, which may be a time period (denoted as time_overlap) associated with an overlapping region of the plurality of exposure rows. During the time period associated with the overlapping region, all of the plurality of exposure rows are exposed at the same time. Accordingly, using this time period as the target time period in which the warning light is controlled to keep turned on and outside of which the warning light is controlled to keep turned off can ensure that the brightness of the monitoring screen would not be affected and a flicker would not appear in the monitoring screen, thereby realizing both the warning function and the supplementary light function.

In some embodiments, if the start exposure time of the last exposure Row n is later than the end exposure time of the first exposure Row1 (i.e., the start exposure time of the last exposure Row n and the start exposure time of the first exposure Row1 for (n−1)*Δt are not within a same shutter time T), that is, the difference (i.e., T−(n−1)*Δt≤0) between the end exposure time of the first exposure Row1 and the start exposure time of the last exposure Row n is less than or equal to 0, the processing device 112 may determine that the target time period does not exist. In this situation, the processing device 112 may adjust the at least one parameter (e.g., the shutter time T, a count (i.e., n) of the plurality of exposure rows, the exposure interval Δt between adjacent exposure rows) of the monitoring device to make the target time period exists or adjust the target time period. For example, the processing device 112 may reduce the exposure interval Δt to make the target time period exists. As another example, the processing device 112 may increase the shutter time T to increase the target time period.

Figure 8:
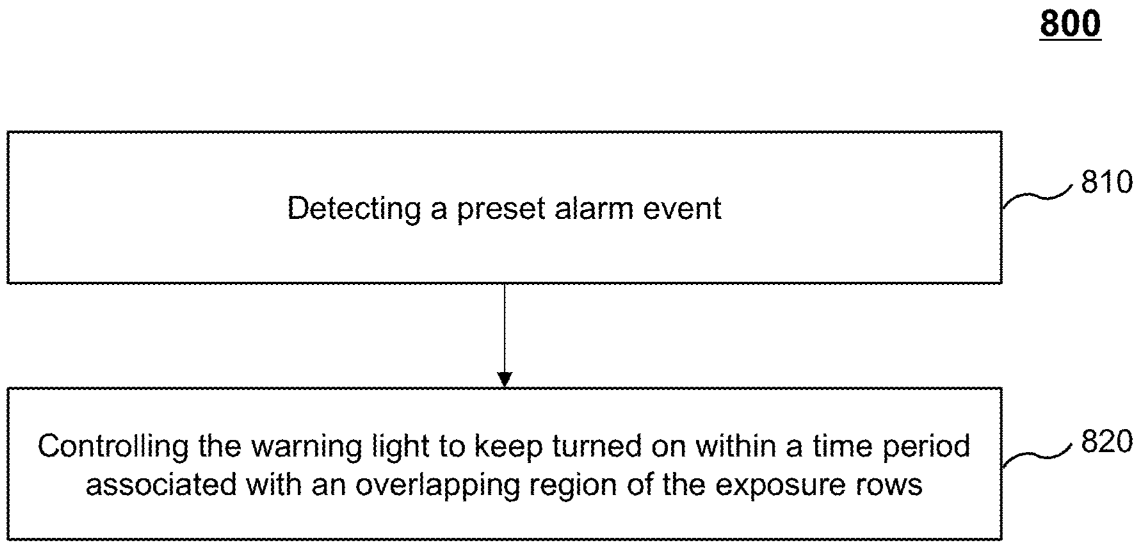
FIG. 8 is a flowchart illustrating an exemplary process for controlling a warning light associated with a monitoring device according to some embodiments of the present disclosure.

FIG. 8 is a flowchart illustrating an exemplary process for controlling a warning light associated with a monitoring device according to some embodiments of the present disclosure.

In some embodiments, process 800 may be executed by the monitoring control system 100. For example, the process 800 may be implemented as a set of instructions (e.g., an application) stored in a storage device (e.g., the storage device 150, the ROM 230, the RAM 240, and/or the storage 390). In some embodiments, the processing device 112 (e.g., the processor 220 of the computing device 200, the CPU 340 of the mobile device 300, and/or one or more modules illustrated in FIG. 4) and/or the monitoring control device 1400 (e.g., one or more units illustrated in FIG. 14) illustrated in FIG. 14 may execute the set of instructions and may accordingly be directed to perform the process 800. The operations of the illustrated process presented below are intended to be illustrative. In some embodiments, the process 800 may be accomplished with one or more additional operations not described and/or without one or more of the operations discussed. Additionally, the order of the operations of process 800 illustrated in FIG. 8 and described below is not intended to be limiting.

In 810, a preset alarm event may be detected. In some embodiments, the preset alarm event may be detected by the processing device 112 (e.g., the determination module 420 illustrated in FIG. 4) (e.g., the processing circuits of the processor 220) and/or the monitoring control device 1400 (e.g., a detection module 1410 illustrated in FIG. 14).

As described in connection with FIG. 5, the preset alarm event may include an object appearing in the monitoring region (i.e. an object appearing on a monitoring screen of the monitoring device), a fire breaking out, an object displacement, a conflict, an accident, or the like, or any combination thereof. In some embodiments, whether the preset alarm event occurs in a monitoring region may be detected in real-time. Merely by way of example, whether the preset alarm event occurs in the monitoring region may be detected by a monitoring device (e.g., the monitoring device 130). In some embodiments, the monitoring device may include a camera (e.g., the camera 130-1) or other devices that include or communicate with a warning light. The warning light may include a sensor. The sensor may include a pyroelectric infrared sensor, a temperature sensor, a humidity sensor, or the like, or any combination thereof. For example, the monitoring device may be a CMOS image sensor (also referred to as a CMOS camera) or a CCD image sensor (also referred to as a CCD camera). An exposure manner of the CMOS image sensor may be progressive exposure, that is, exposure rows may be sequentially exposed by the CMOS image sensor. An exposure manner of the CCD camera may be global exposure, that is, exposure rows may be exposed by the CCD camera at the same time.

In 820, the warning light may be controlled to keep turned on within a time period associated with an overlapping region of the exposure rows. In some embodiments, the warning light may be controlled, by the processing device 112 (e.g., the controlling module 440 illustrated in FIG. 4) (e.g., the processing circuits of the processor 220) and/or the monitoring control device 1400 (e.g., a controlling module 1420 illustrated in FIG. 14), to keep turned on within the time period associated with the overlapping region of the exposure rows.

As described in connection with FIG. 5, when the monitoring device is the CMOS camera and the exposure rows are sequentially exposed, the overlapping region of the exposure rows may refer to an overlap time period during which all exposure rows are exposed at the same time. When the monitoring device is the CCD camera and the exposure rows are exposed at the same time, the overlapping region of the exposure rows may refer to an exposure time of the CCD camera.

In some embodiments, if exposure parameters of the monitoring device are fixed and the overlapping region exists, the warning light may be controlled to keep turned on within the time period associated with the overlapping region and keep dimmed (or turned off) outside of the time period associated with the overlapping region, so as to realize a flicker of the warning light (i.e., realize a warning function). In addition, since the warning light is controlled to keep turned on within the time period associated with the overlapping region, the brightness received by the exposure rows within the time period is the same, thereby eliminating or reducing the impact of the flicker of the warning light on the monitoring effect of the monitoring device, for example, eliminating a flicker of the monitoring screen of the monitoring device caused by the flicker of the warning light.

Additionally or alternatively, the warning light may be controlled to turn on and dim several times within the time period associated with the overlapping region of the exposure rows, and controlled to dim outside of the time period associated with the overlapping region.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 9:
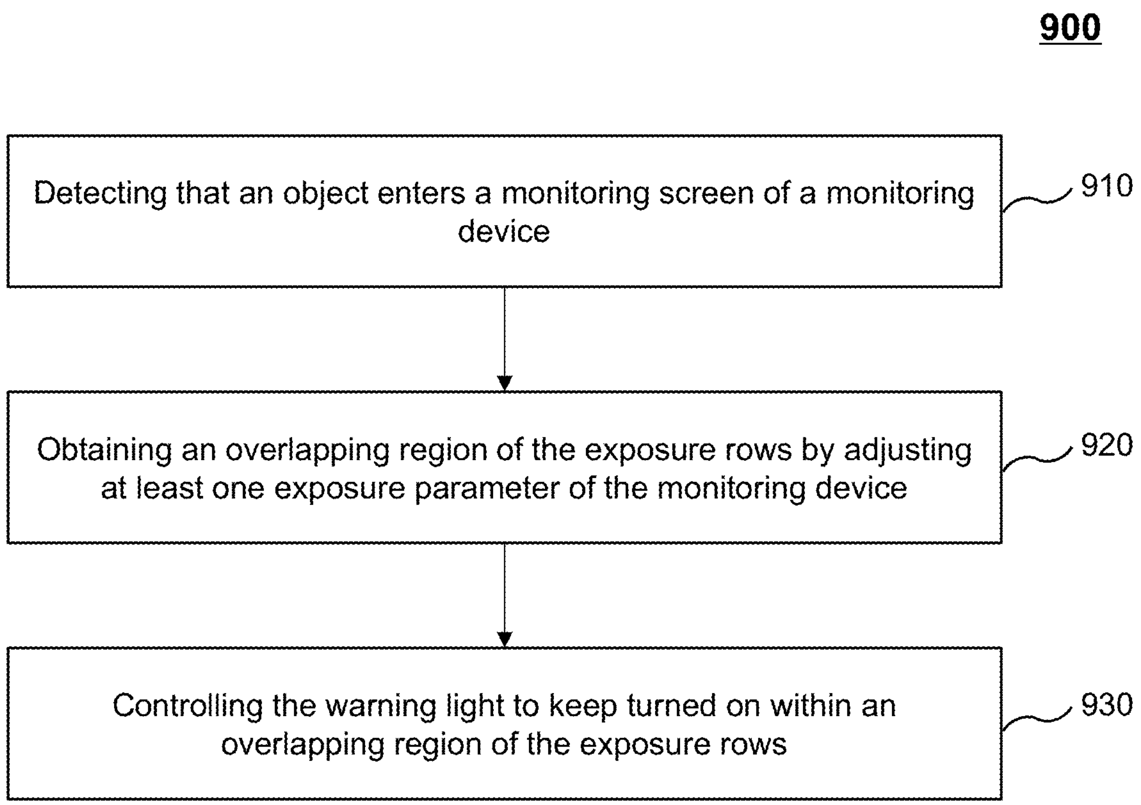
FIG. 9 is a flowchart illustrating an exemplary process for controlling a warning light associated with a monitoring device according to some embodiments of the present disclosure.

FIG. 9 is a flowchart illustrating an exemplary process for controlling a warning light associated with a monitoring device according to some embodiments of the present disclosure. In some embodiments, process 900 may be executed by the monitoring control system 100. For example, the process 900 may be implemented as a set of instructions (e.g., an application) stored in a storage device (e.g., the storage device 150, the ROM 230, the RAM 240, and/or the storage 390). In some embodiments, the processing device 112 (e.g., the processor 220 of the computing device 200, the CPU 340 of the mobile device 300, and/or one or more modules illustrated in FIG. 4) and/or the monitoring control device 1400 (e.g., one or more units illustrated in FIG. 14) illustrated in FIG. 14 may execute the set of instructions and may accordingly be directed to perform the process 900. The operations of the illustrated process presented below are intended to be illustrative. In some embodiments, the process 900 may be accomplished with one or more additional operations not described and/or without one or more of the operations discussed. Additionally, the order of the operations of process 900 illustrated in FIG. 9 and described below is not intended to be limiting.

In 910, a preset alarm event may be detected. For example, an object entering a monitoring screen of a monitoring device may be detected. In some embodiments, the object entering the monitoring screen of the monitoring device may be detected by the processing device 112 (e.g., the determination module 420 illustrated in FIG. 4) (e.g., the processing circuits of the processor 220) and/or the monitoring control device 1400 (e.g., the detection module 1410 illustrated in FIG. 14).

As described in connection with FIG. 8, the monitoring device may detect whether there is an object entering the monitoring screen in real time. More descriptions can be found in operation 810 and are not repeated here.

In 920, an overlapping region of the exposure rows may be obtained by adjusting at least one exposure parameter of the monitoring device. In some embodiments, the overlapping region of the exposure rows may be obtained by the processing device 112 (e.g., the second obtaining module 430 illustrated in FIG. 4) (e.g., the processing circuits of the processor 220) and/or the monitoring control device 1400 (e.g., the detection module 1410 illustrated in FIG. 14).

In some situations, as described in connection with operation 530, there may be no overlapping region among the exposure rows under the exposure parameters of the monitoring device. For example, as illustrated in FIG. 6, when the monitoring device is a CMOS image sensor, a plurality of exposure rows (e.g., Row1, Row2, Row3, Row4, . . . , Row n-3, Row n-2, Row n-1, and Row n) may be sequentially exposed by a shutter of the CMOS image sensor, and an exposure interval between adjacent exposure rows is denoted as $\Delta t$. If the start exposure time of the last exposure Row n is later than the end exposure time of the first exposure Row1, there is no overlapping region among the exposure rows. In such cases, the flicker of the warning light may affect the monitoring effect of the monitoring device, for example, cause the flicker of the monitoring screen of the monitoring device.

Accordingly, in some embodiments, when the object entering the monitoring screen of the monitoring device is detected, at least one exposure parameter of the monitoring device may be adjusted to obtain an overlapping region. Further, the warning light may be controlled to keep turned on within the overlapping region and keep dimmed outside of the time period associated with the overlapping region, which makes that brightness received by the exposure rows within the time period associated with the overlapping region is the same, thereby eliminating the impact of the flicker of the warning light on the monitoring effect of the monitoring device. More descriptions regarding the obtaining or adjustment of the overlapping region may be found elsewhere in the present disclosure, for example, FIG. 6 and relevant descriptions thereof.

In 930, the warning light may be controlled to keep turned on within the time period associated with the overlapping region of the exposure rows. Operation 910 may be performed in a similar manner as operation 820, and relevant descriptions are not repeated here.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 10:
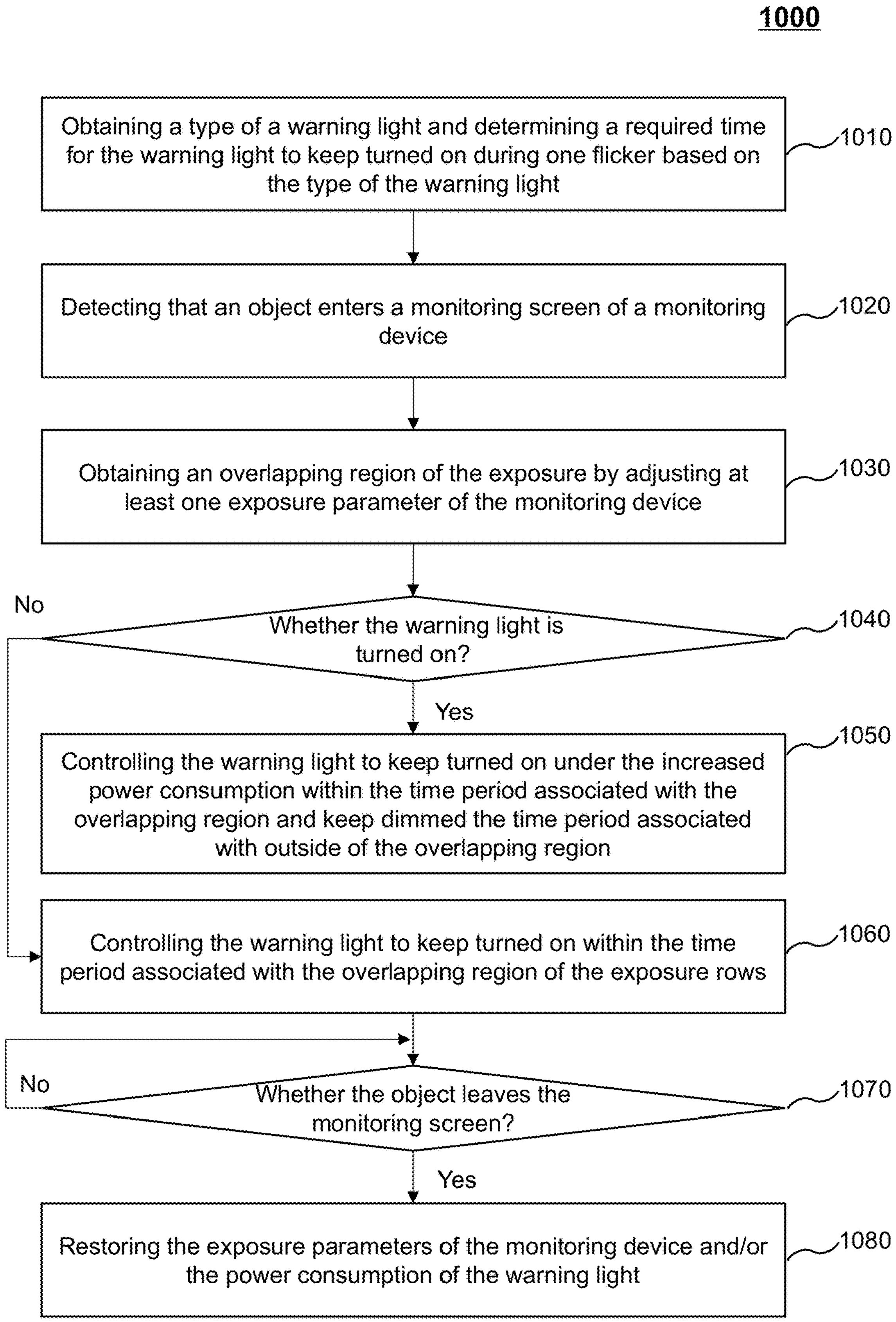
FIG. 10 is a flowchart illustrating an exemplary process for controlling a warning light associated with a monitoring device according to some embodiments of the present disclosure.

FIG. 10 is a flowchart illustrating an exemplary process for controlling a warning light associated with a monitoring device according to some embodiments of the present disclosure. In some embodiments, process 1000 may be executed by the monitoring control system 100. For example, the process 1000 may be implemented as a set of instructions (e.g., an application) stored in a storage device (e.g., the storage device 150, the ROM 230, the RAM 240, and/or the storage 390). In some embodiments, the processing device 112 (e.g., the processor 220 of the computing device 200, the CPU 340 of the mobile device 300, and/or one or more modules illustrated in FIG. 4) and/or the monitoring control device 1400 (e.g., one or more units illustrated in FIG. 14) illustrated in FIG. 14 may execute the set of instructions and may accordingly be directed to perform the process 1000. The operations of the illustrated process presented below are intended to be illustrative. In some embodiments, the process 1000 may be accomplished with one or more additional operations not described and/or without one or more of the operations discussed. Additionally, the order of the operations of process 1000 illustrated in FIG. 10 and described below is not intended to be limiting.

In 1010, a type of a warning light may be obtained and a required time for the warning light to keep turned on during one flicker may be determined based on the type of the warning light. In some embodiments, operation 1010 may be performed by the processing device 112 (e.g., the determination module 420 illustrated in FIG. 4) (e.g., the processing circuits of the processor 220) and/or the monitoring control device 1400 (e.g., the detection module 1410 illustrated in FIG. 14).

Generally, due to the timing requirements for the flicker of the warning light, flicker frequencies and corresponding high level durations of different types (e.g., an infrared light, a white light, a red and blue warning light, a monochrome warning light) of warning lights are different. In addition, pulse-width modulation (PWM) duty ratios of the different types of warning lights are also different. Therefore, the type of the warning light may be obtained (or reference parameters of the warning light (e.g., the type of the warning light, a duty ratio of the warning light, a flicker frequency of the warning light, a high level duration and a low level duration of the flicker of the warning light) may be determined). According to the type of the warning light (or the reference parameters of the warning light), the required time for the warning light to keep turned on during one flicker may be determined. Further, a required duration of the overlapping region of the exposure rows may be determined based on the required time for the warning light to keep turned on during one flicker. For example, the required duration of the overlapping region of the exposure rows may be equal to the required time for the warning light to keep turned on during one flicker.

In 1020, an object entering a monitoring screen of the monitoring device may be detected. Operation 1010 may be performed in a similar manner as operation 910, and relevant descriptions are not repeated here.

In 1030, an overlapping region of the exposure rows may be obtained by adjusting at least one exposure parameter of the monitoring device. For example, the at least one exposure parameter of the monitoring device may be adjusted to determine an overlapping region with a duration equal to the required duration of the overlapping region determined in operation 1010. Operation 1030 may be performed in a similar manner as operation 920, and relevant descriptions are not repeated here.

In some embodiments, an exposure interval between adjacent exposure rows and/or frames per second (FPS) may be reduced, so that the duration of the overlapping region may be larger than or equal to the required time for the warning light to keep turned on during one flicker.

In 1040, whether the warning light is turned on may be determined. In some embodiments, whether the warning light is turned on may be determined by the processing device 112 (e.g., the determination module 420 illustrated in FIG. 4) (e.g., the processing circuits of the processor 220) and/or the monitoring control device 1400 (e.g., the detection module 1410 illustrated in FIG. 14).

In some embodiments, there may be only one warning light which may be used for supplementary light and alert, which can reduce equipment costs. Additionally or alternatively, there may be more than one warning light. For example, a plurality of warning lights may be controlled synchronously for supplementary light and alert. As another example, a portion of the plurality of warning lights may be used for supplementary light and a portion of the plurality of warning lights may be used for alert.

Accordingly, in some embodiments, whether the warning light (which is used for supplementary light and alert) is turned on may be determined (which indicates whether an environmental brightness meets monitoring requirements). Further, different control strategies may be performed based on a determination result that whether the warning light is turned on. For example, if the warning light is not turned on (which indicates that the environmental brightness is relatively high and no supplementary light is needed), operation 1060 may be performed. As another example, if the warning light is turned on (which indicates that the environmental brightness is relatively low and the warning light is used for supplementary light), operation 1050 may be performed.

Generally, when the environmental brightness is relatively low, the warning light is turned on; when the environmental brightness is relatively high, the warning light would not be turned on. In some embodiments, the monitoring device may detect the environmental brightness in real time and determine whether to turn on the warning light based on the environmental brightness. Specifically, a reference value associated with the environment brightness may be determined according to an equation (1) below:

$$envY = 20 * \log\ gain * shutter * 1024 / ev, \tag{1}$$

wherein envY refers to the reference value, gain refers to an exposure gain value of the monitoring device, log gain refers to a logarithmic exposure gain value, shutter refers to a shutter time of the monitoring device (i.e., an exposure duration of an exposure row), ev refers to an average brightness of the monitoring screen of the monitoring device (which can be considered as the environmental brightness). It can be seen that the reference value is inversely proportional to the environmental brightness. The higher the environmental brightness is, the smaller the reference value may be; the lower the environmental brightness is, the greater the reference value may be.

Further, whether the reference value is larger than a predetermined threshold may be determined. The predetermined threshold may be a default setting of the monitoring control system 100 or may be adjustable under different situations. If the reference value is larger than the predetermined threshold, it may indicate that the environmental brightness is relatively low, and the monitoring device may determine to turn on the warning light to supplement light. If the reference value is less than or equal to the predetermined threshold, it may indicate that environmental brightness is relatively high and no supplementary light is needed, the warning light would not be turned on and the environmental brightness will be continuously detected.

In 1050, if the warning light is turned on (which indicates that the environmental brightness is relatively low and the warning light is used for supplementary light), a power consumption of the warning light may be increased and the warning light may be controlled to keep turned on under the increased power consumption within the time period associated with the overlapping region and keep dimmed (or turned off) outside of the time period associated with the overlapping region. In some embodiments, operation 1050 may be performed by the processing device 112 (e.g., the controlling module 440 illustrated in FIG. 4) (e.g., the processing circuits of the processor 220) and/or the monitoring control device 1400 (e.g., the controlling module 1420 illustrated in FIG. 14).

In some embodiments, the power consumption of the warning light may be increased based on the shutter time of the monitoring device, the duration of the overlapping region, and the type of the warning light. For example, the power consumption of the warning light may be increased according to an equation (2) below:

$$P_{led} = shutter / time\_overlap * K_{led}, \tag{2}$$

wherein $P_{led}$ refers to an increasing amount of the power consumption, shutter refers to the shutter time of the monitoring device (i.e., the exposure duration of an exposure row), time_overlap refers to the duration of the overlapping region, and $K_{led}$ refers to a proportional coefficient which is related to the type of the warning light.

According to some embodiments, when the warning light has been turned on (which indicates that the environmental brightness is relatively low and the warning light is used for supplementary light), the power consumption of the warning light may be increased. Then the warning light may be controlled to keep turned on under the increased power consumption within the time period associated with the overlapping region and keep dimmed (or turned off) outside of the time period associated with the overlapping region, which can ensure that a warning function can be realized, a global brightness of the monitoring screen would not be affected, and a flicker would not appear in the monitoring screen.

In 1060, if the warning light is not turned on (which indicates that the environmental brightness is relatively high and no supplementary light is needed), the warning light may be controlled to keep turned on within the time period associated with the overlapping region of the exposure rows (i.e., the power consumption is not needed to be increased). In some embodiments, the warning light may be controlled to keep turned on within the time period associated with the overlapping region of the exposure rows and keep dimmed (turned off) outside of the time period associated with the overlapping region. Operation 1060 may be performed in a similar manner as operation 820, and relevant descriptions are not repeated here.

In 1070, whether the object leaves the monitoring screen (i.e., whether the target event disappears in the monitoring region) may be detected. In some embodiments, whether the object leaves the monitoring screen may be detected by the processing device 112 (e.g., the controlling module 440 illustrated in FIG. 4) (e.g., the processing circuits of the processor 220) and/or the monitoring control device 1400 (e.g., the controlling module 1420 illustrated in FIG. 14).

In 1080, if it is determined that the object leaves the monitoring screen, the exposure parameters of the monitoring device and/or the power consumption of the warning light may be restored. In some embodiments, the exposure parameters and/or the power consumption of the warning light may be restored by the processing device 112 (e.g., the controlling module 440 illustrated in FIG. 4) (e.g., the processing circuits of the processor 220) and/or the monitoring control device 1400 (e.g., the controlling module 1420 illustrated in FIG. 14).

In some embodiments, if the object leaves the monitoring screen, which indicates that the preset alarm event is cleared, the exposure parameters of the monitoring device and/or the power consumption of the warning light may be restored, which can avoid heating and poor performance of the monitoring device or the warning light due to excessive power consumption.

In some embodiments, if the object leaves the monitoring screen, the exposure parameters of the monitoring device and/or the power consumption of the warning light may not be restored (i.e., remain fixed). In such cases, when another object enters the monitoring screen of the monitoring device, there is no need to adjust the exposure parameters of the monitoring device and/or the power consumption of the warning light, the warning light can be directly controlled to turn on within the time period associated with the overlapping region, which can increase the efficiency of controlling the warning light.

In some embodiments, when the preset alarm event is a fire breaking out, a condition indicating the alarm is cleared may be a detection of the disappearance of flames in the monitoring screen. It should be noted that different preset alarm events correspond to different conditions indicating the alarm is cleared. In some embodiments, the alarm may be automatically cleared by the monitoring device or manually cleared by an operator.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 11:
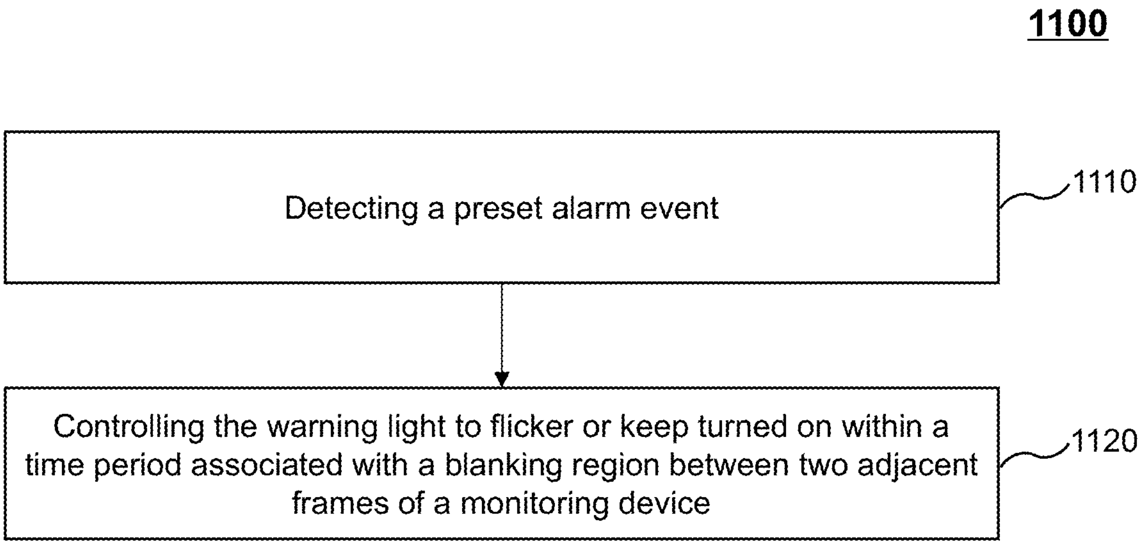
FIG. 11 is a flowchart illustrating an exemplary process for controlling a warning light associated with a monitoring device according to some embodiments of the present disclosure.

FIG. 11 is a flowchart illustrating an exemplary process for controlling a warning light associated with a monitoring device according to some embodiments of the present disclosure. In some embodiments, process 1100 may be executed by the monitoring control system 100. For example, the process 1100 may be implemented as a set of instructions (e.g., an application) stored in a storage device (e.g., the storage device 150, the ROM 230, the RAM 240, and/or the storage 390). In some embodiments, the processing device 112 (e.g., the processor 220 of the computing device 200, the CPU 340 of the mobile device 300, and/or one or more modules illustrated in FIG. 4) and/or the monitoring control device 1400 (e.g., one or more units illustrated in FIG. 14) illustrated in FIG. 14 may execute the set of instructions and may accordingly be directed to perform the process 1100. The operations of the illustrated process presented below are intended to be illustrative. In some embodiments, the process 1100 may be accomplished with one or more additional operations not described and/or without one or more of the operations discussed. Additionally, the order of the operations of process 1100 illustrated in FIG. 11 and described below is not intended to be limiting.

In 1110, a preset alarm event may be detected. In some embodiments, the preset alarm event may be detected by the processing device 112 (e.g., the determination module 420 illustrated in FIG. 4) (e.g., the processing circuits of the processor 220) and/or the monitoring control device 1400 (e.g., a detection module 1410 illustrated in FIG. 14). Operation 1110 may be performed in a similar manner as operation 810, and relevant descriptions are not repeated here.

In 1120, the warning light may be controlled to flicker or keep turned on within a time period associated with a blanking region between two adjacent frames of a monitoring device (e.g., the monitoring device 130). In some embodiments, the warning light may be controlled by the processing device 112 (e.g., the controlling module 440 illustrated in FIG. 4) (e.g., the processing circuits of the processor 220) and/or the monitoring control device 1400 (e.g., a controlling module 1420 illustrated in FIG. 14).

In some embodiments, when the monitoring device is a CMOS image sensor and the exposure rows are sequentially exposed by the CMOS image sensor, the blanking region may refer to a time period (e.g., the time_dummy illustrated in FIG. 7) between an end exposure time of a last exposure row (e.g., Row n illustrated in FIG. 7) corresponding to a frame and a start exposure time of a first exposure row (e.g., Row1' illustrated in FIG. 7) corresponding to a next frame. When the monitoring device is a CCD camera and the exposure rows are exposed by the CCD camera at the same time, the blanking region may refer to a time period between an end exposure time of a frame and a start exposure time of a next frame.

In some embodiments, if exposure parameters of the monitoring device are fixed and the blanking region exists, the warning light may be controlled to flicker or keep turned on within the time period associated with the blanking region. For example, the warning light may be controlled to flicker within the time period associated with the blanking region and to keep turned on outside of the time period associated with the blanking region (when the environmental brightness is relatively low). As another example, the warning light may be controlled to keep turned on within the time period associated with the blanking region and to keep turned off outside of the time period associated with the blanking region (when the environmental brightness is relatively high and no supplementary light is needed), so as to realize a flicker of the warning light (i.e., realize a warning function). As a further example, the warning light may be controlled to flicker within the time period associated with the blanking region and to keep turned off outside of the time period associated with the blanking region (when the environmental brightness is relatively high and no supplementary light is needed). In some embodiments, the warning light may be controlled to keep turned off within the time period associated with the blanking region and to keep turned on outside of the time period associated with the blanking region (when the environmental brightness is relatively low), so as to realize a flicker of the warning light (i.e., realize a warning function).

Since the monitoring device does not capture frames in the time period associated with the blanking region, the brightness change within the time period associated with the blanking region caused by the warning light would not impact the monitoring effect of the monitoring device.

In some embodiments, the warning light may include a red and blue warning light, a monochrome warning light, etc. When the warning light is the red and blue warning light, the warning light may be controlled to keep turned on within the time period associated with the blanking region and keep dimmed (or turned off) outside of the time period associated with the blanking region, which can prevent the red and blue light from affecting an imaging color of the monitoring device. When the warning light is the monochrome warning light, the warning light may be controlled to flicker or keep turned on within the time period associated with the blanking region and keep dimmed (or turned off) outside of the time period associated with the blanking region.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 12:
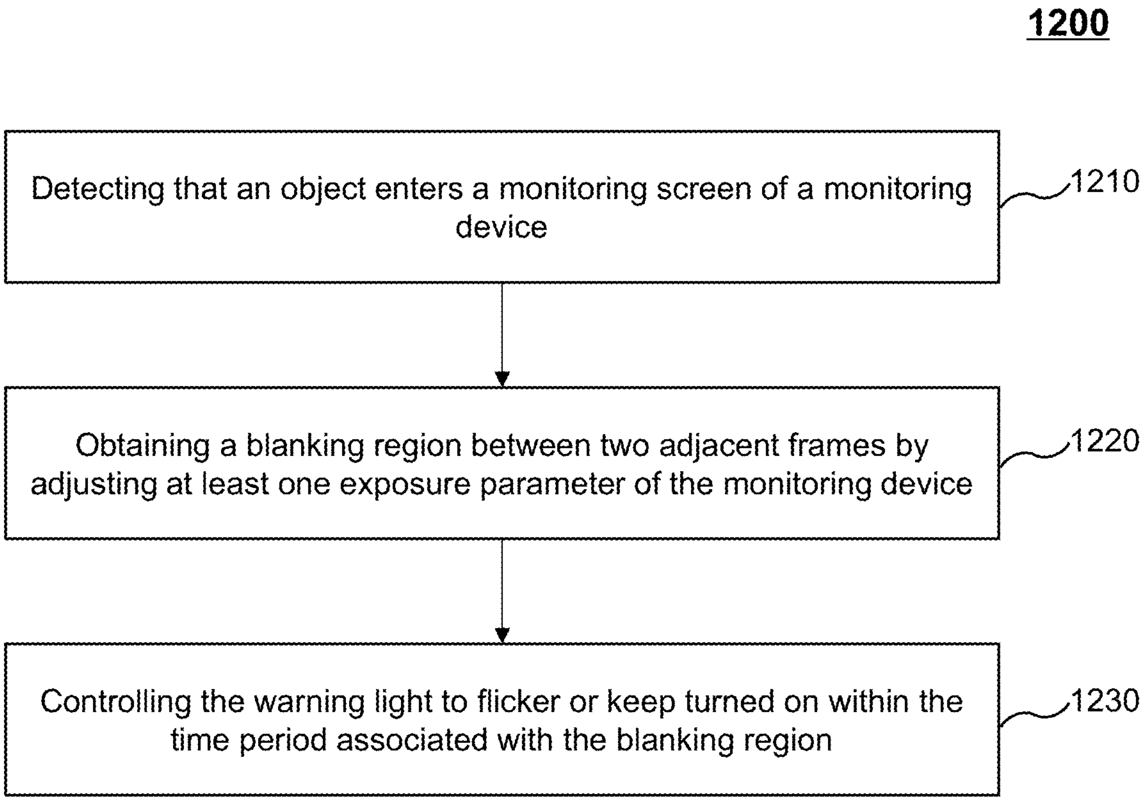
FIG. 12 is a flowchart illustrating an exemplary process for controlling a warning light associated with a monitoring device according to some embodiments of the present disclosure.

FIG. 12 is a flowchart illustrating an exemplary process for controlling a warning light associated with a monitoring device according to some embodiments of the present disclosure. In some embodiments, process 1200 may be executed by the monitoring control system 100. For example, the process 1200 may be implemented as a set of instructions (e.g., an application) stored in a storage device (e.g., the storage device 150, the ROM 230, the RAM 240, and/or the storage 390). In some embodiments, the processing device 112 (e.g., the processor 220 of the computing device 200, the CPU 340 of the mobile device 300, and/or one or more modules illustrated in FIG. 4) and/or the monitoring control device 1400 (e.g., one or more units illustrated in FIG. 14) illustrated in FIG. 14 may execute the set of instructions and may accordingly be directed to perform the process 1200. The operations of the illustrated process presented below are intended to be illustrative. In some embodiments, the process 1200 may be accomplished with one or more additional operations not described and/or without one or more of the operations discussed. Additionally, the order of the operations of process 1200 illustrated in FIG. 12 and described below is not intended to be limiting.

In 1210, a preset alarm event may be detected. For example, an object entering a monitoring screen of a monitoring device may be detected. Operation 1210 may be performed in a similar manner as operation 910, and relevant descriptions are not repeated here.

In 1220, a blanking region between two adjacent frames may be obtained by adjusting at least one exposure parameter of the monitoring device. In some embodiments, the blanking region may be obtained by the processing device 112 (e.g., the second obtaining module 430 illustrated in FIG. 4) (e.g., the processing circuits of the processor 220) and/or the monitoring control device 1400 (e.g., the detection module 1410 illustrated in FIG. 14).

In some situations, as described in connection with operation 530, there may be no blanking region between two adjacent frames. For example, as illustrated in FIG. 7, when the monitoring device is a CMOS image sensor and a plurality of frames (e.g., a frame A, a frame B) of the monitoring device may be sequentially exposed by the shutter of the CMOS image sensor, wherein each of the plurality of frames may include a plurality of exposure rows (e.g., Row1, Row2, Row3, Row4, . . . , Row n-3, Row n-2, Row n-1, and Row n corresponding to the frame A; Row1', Row2', Row3', Row4', . . . , Row n-3', Row n-2', Row n-1', and Row n' corresponding to the frame B). If the start exposure time of the first exposure Row1' corresponding to the frame B is earlier than the end exposure time of the last exposure Row n corresponding to the frame A, there is no blanking region between the frame A and the next frame B. In such cases, the flicker of the warning light may affect the monitoring effect of the monitoring device, for example, the flicker of the warning light may cause the flicker of the monitoring screen of the monitoring device.

Accordingly, in some embodiments, when the object entering the monitoring screen of the monitoring device is detected, at least one exposure parameter may be adjusted to obtain a blanking region. Further, the warning light may be controlled to flicker or keep turned on within the time period associated with the blanking region and keep dimmed outside of the time period associated with the blanking region. Since the monitoring device does not capture frames in the time period associated with the blanking region, the brightness change within the time period associated with the blanking region caused by the warning light would not impact the monitoring effect of the monitoring device. More descriptions regarding the obtaining of the blanking region may be found elsewhere in the present disclosure, for example, FIG. 7 and relevant descriptions thereof.

In 1230, the warning light may be controlled to flicker or keep turned on within the time period associated with the blanking region.

In some embodiments, the warning light may be controlled to flicker within the time period associated with the blanking region. For example, the warning light may be controlled to flicker within the time period associated with the blanking region and to keep turned on outside of the time period associated with the blanking region (when the environmental brightness is relatively low). As another example, the warning light may be controlled to flicker within the time period associated with the blanking region and to keep turned off outside of the time period associated with the blanking region (when the environmental brightness is relatively high and no supplementary light is needed). In some embodiments, the warning light may be controlled to flicker by adjusting a PWM duty ratio of the warning light. As used herein, the PWM duty ratio of the warning light may be used to control a brightness of the warning light. The larger the PWM duty ratio of the warning light is, the brighter the brightness of the warning light may be; the smaller the PWM duty ratio of the warning light is, the darker the brightness of the warning light may be. When the PWM duty ratio of the warning light is adjusted to the maximum value, the brightness of the warning light reaches a maximum brightness. When the PWM duty ratio of the warning light is adjusted to the minimum value, the warning light is turned off. Specifically, the PWM duty ratio of the warning light may be adjusted so that the PWM duty ratio of the warning light reaches a relatively high value at least once and a relatively low value at least once within the time period associated with the blanking region, which can realize the flicker of the warning light.

In some embodiments, the warning light may be controlled to keep turned on within the time period associated with the blanking region. For example, the warning light may be controlled to keep turned on within the time period associated with the blanking region and keep turned off outside of the time period associated with the blanking region. In some embodiments, similarly, the warning light may be controlled by adjusting the PWM duty ratio of the warning light. Specifically, the PWM duty ratio of the warning light may be adjusted so that the PWM duty ratio of the warning light reaches a relatively high value (or the maximum value) within the time period associated with the blanking region and reaches a relatively low value (or the minimum value) outside of the time period associated with the blanking region.

In some embodiments, the warning light may be controlled to keep turned off within the time period associated with the blanking region and keep turned on outside of the time period associated with the blanking region. In some embodiments, similarly, the warning light may be controlled by adjusting the PWM duty ratio of the warning light. Specifically, the PWM duty ratio of the warning light may be adjusted so that the PWM duty ratio of the warning light reaches a relatively low value (or the minimum value) within the time period associated with the blanking region and reaches a relatively high value (or the maximum value) outside of the time period associated with the blanking region.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the flicker frequency of the warning light may be set according to user needs.

Figure 13:
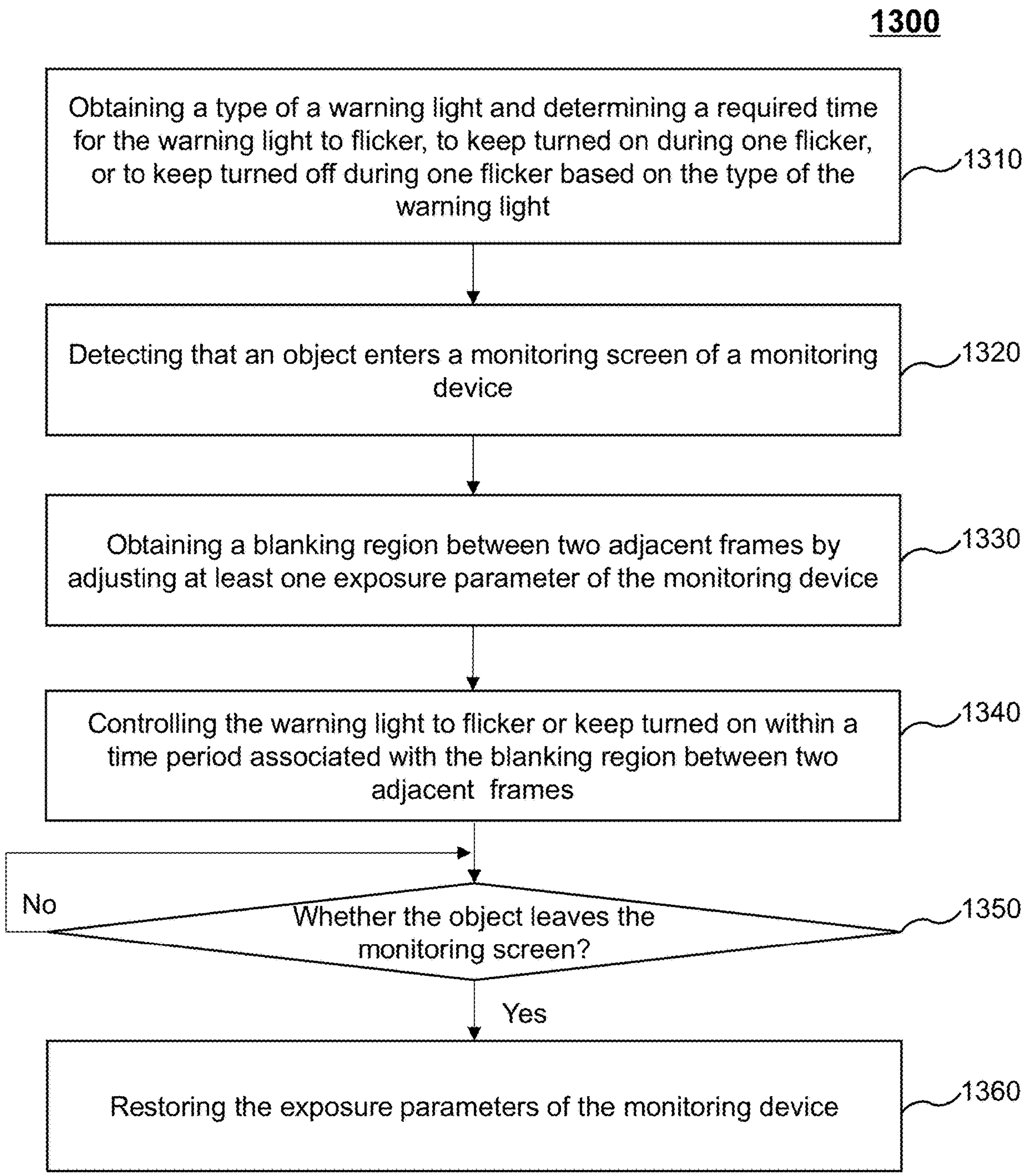
FIG. 13 is a flowchart illustrating an exemplary process for controlling a warning light associated with a monitoring device according to some embodiments of the present disclosure.

FIG. 13 is a flowchart illustrating an exemplary process for controlling a warning light associated with a monitoring device according to some embodiments of the present disclosure. In some embodiments, process 1300 may be executed by the monitoring control system 100. For example, the process 1300 may be implemented as a set of instructions (e.g., an application) stored in a storage device (e.g., the storage device 150, the ROM 230, the RAM 240, and/or the storage 390). In some embodiments, the processing device 112 (e.g., the processor 220 of the computing device 200, the CPU 340 of the mobile device 300, and/or one or more modules illustrated in FIG. 4) and/or the monitoring control device 1400 (e.g., one or more units illustrated in FIG. 14) illustrated in FIG. 14 may execute the set of instructions and may accordingly be directed to perform the process 1300. The operations of the illustrated process presented below are intended to be illustrative. In some embodiments, the process 1300 may be accomplished with one or more additional operations not described and/or without one or more of the operations discussed. Additionally, the order of the operations of process 1300 illustrated in FIG. 13 and described below is not intended to be limiting.

In 1310, a type of a warning light may be obtained and a required time for the warning light to flicker, to keep turned on during one flicker, or to keep turned off during one flicker may be determined based on the type of the warning light.

As described in connection with operation 1010, according to the type of the warning light (or the reference parameters of the warning light), the required time for the warning light to flicker, to keep turned on during one flicker, or to keep turned off during one flicker may be determined. Further, a required duration of the blanking region between two adjacent frames may be determined based on (e.g., equal to) the required time for the warning light to flicker, to keep turned on during one flicker, or to keep turned off during one flicker.

In 1320, an object entering a monitoring screen of a monitoring device may be detected. Operation 1320 may be performed in a similar manner as operation 1010 or operation 910, and relevant descriptions are not repeated here.

In 1330, a blanking region between two adjacent frames may be obtained by adjusting at least one exposure parameter of the monitoring device. For example, the at least one exposure parameter of the monitoring device may be adjusted to determine a blanking region with a duration equal to the required duration of the blanking region determined in operation 1310. Operation 1330 may be performed in a similar manner as operation 1220, and relevant descriptions are not repeated here.

In 1340, the warning light may be controlled to flicker or keep turned on within a time period associated with the blanking region between two adjacent frames. Operation 1340 may be performed in a similar manner as operation 1230, and relevant descriptions are not repeated here.

In 1350, whether the object leaves the monitoring screen (i.e., whether the target event disappears in the monitoring region) may be detected. Operation 1340 may be performed in a similar manner as operation 1070, and relevant descriptions are not repeated here.

In 1360, if it is determined that the object leaves the monitoring screen, the exposure parameters of the monitoring device may be restored. Operation 1360 may be performed in a similar manner as operation 1080, and relevant descriptions are not repeated here.

In some embodiments, the reference parameters may also include flicker characteristics. The flicker characteristics refer to data associated with the flicker of the warning light. The flicker characteristics may include at least one of a flicker frequency, a flicker color, or the like. The flicker color is a color of the warning light when the warning light is flickering (e.g. a red and blue flicker, etc.).

In some embodiments, the processing device 112 may determine the flicker characteristics based on a type of the target event and morphological change characteristics of the target event. For example, the processing device 112 may determine flicker characteristics corresponding to the type and the morphological change characteristics of the target event by querying a preset characteristic table based on the type and the morphological change characteristics of the target event to obtain current flicker characteristics. More descriptions of the type and the morphological change characteristics of the target event may be found in FIG. 5 and its related descriptions.

In some embodiments, the preset characteristic table is pre-set based on historical experience and includes a plurality of sets of types and morphological change characteristics of the target events as well as flicker characteristics corresponding to each set of types and morphological change characteristics of the target events.

In some embodiments of the present disclosure, the type and the morphological change characteristics of the target event can be used to determine more appropriate flicker characteristics, which facilitates the effective warning of the occurrence of the target event in the monitoring region.

In some embodiments, in response to determining that the target event occurs in the monitoring region, the processing device 112 may control the warning light to remain lit and/or flicker in a target blanking region, and control the warning light to remain lit in a non-blanking region. In response to determining that the target event does not occur in the monitoring region, the processing device 112 may determine whether to control the warning light to remain lit based on environmental characteristics.

The non-blanking region refers to a time period outside the target blanking region.

In some embodiments, in response to determining that it is in the target blanking region when the target event occurs in the monitoring region, the processing device 112 may control the warning light to remain lit and/or flicker to warn of the occurrence of the target event. In response to determining that it is in the non-blanking region when the target event occurs in the monitoring region, the processing device 112 may control the warning light to remain lit to supplement light for the monitoring device.

In some embodiments, if the monitoring device also includes a fill light for supplementing light, in response to determining that it is in the target blanking region when the target event occurs in the monitoring region, the processing device 112 may control the warning light to flicker and control the fill light to remain lit to warn that the target event occurs and to supplement light for the monitoring device. In response to determining that it is in the non-blanking region when the target event occurs in the monitoring region, the processing device 112 may control the warning light to remain off and the fill light to remain lit to supplement light for the monitoring device. The flicker refers to the warning light turning on, turning off, and then turning on again. Remaining lit refers to that the warning light or the fill light emit light continuously.

In some embodiments, in response to determining that the target event does not occur in the monitoring region, the processing device 112 may determine whether to control the warning light to remain lit based on the environmental characteristics. For example, if an ambient light intensity in the environmental characteristics is less than a preset light intensity threshold, the processing device 112 may control the warning light to remain lit to supplement light for the monitoring device. If the ambient light intensity in the environmental characteristics is not less than the preset light intensity threshold, the processing device 112 may control the warning light to remain off. The preset light intensity threshold may be pre-set based on historical experience. More descriptions of the environmental characteristics may be found in FIG. 5 and its related descriptions.

In some embodiments, if the monitoring device also includes the fill light for supplementing light, in response to determining that the target event does not occur in the monitoring region, the processing device 112 may determine whether to control the fill light to remain lit based on the environmental characteristics, which is similar to the manner in which the processing device 112 determines whether to control the warning light to remain lit based on the environmental characteristics described above.

In some embodiments of the present disclosure, based on whether it is in the target blanking region when the target event occurs in the monitoring region, the warning light can be precisely controlled to remain lit and/or flicker to warn that the target event occurs and/or to supplement light for the monitoring device.

In some embodiments, in response to determining that the target event occurs in the monitoring region, the processing device 112 may also determine whether to control the warning light to remain lit in the target blanking region based on the environmental characteristics, and whether to control the warning light to remain lit in the non-blanking region based on the environmental characteristics. For example, if the ambient light intensity in the environmental characteristics is less than the preset light intensity threshold, the processing device 112 may control the warning light to remain lit in the target blanking region to supplement light for the monitoring device. As another example, if the ambient light intensity in the environmental characteristics is less than the preset light intensity threshold, the processing device 112 may control the warning light to remain lit in the non-blanking region to supplement light for the monitoring device.

In some embodiments, if the monitoring device also includes a fill light for supplementing light, in response to determining that the target event occurs in the monitoring region, the processing device 112 may also determine whether to control the fill light to remain lit in the target blanking region based on the environmental characteristics, and whether to control the fill light to remain lit in the non-blanking region based on the environmental characteristics. The determination is similar to the manner described above for determining whether to control the warning light to remain lit in the target blanking region or the non-blanking region.

In some embodiments of the present disclosure, based on the light intensity of the environment in which the monitoring device is located, whether to supplement light for the monitoring device can be determined more flexibly, avoiding a decrease in the quality of the image due to insufficient light or an increase in the energy consumption due to continual supplementing light for the monitoring device.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 14:
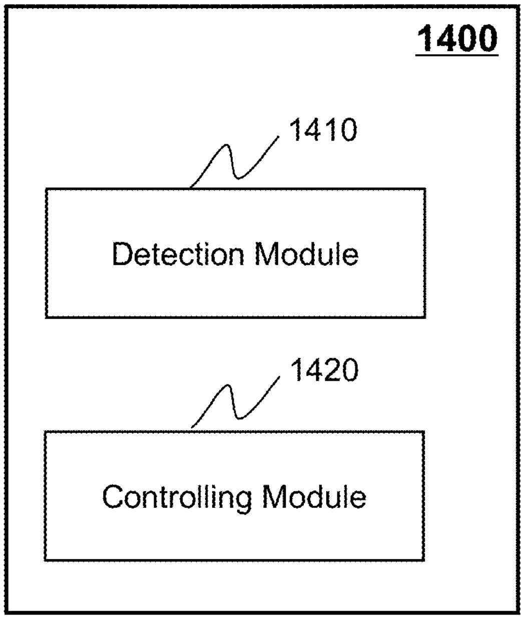
FIG. 14 is a block diagram illustrating an exemplary monitoring control device according to some embodiments of the present disclosure.

FIG. 14 is a block diagram illustrating an exemplary monitoring control device according to some embodiments of the present disclosure. The monitoring control device 1400 may include a detection module 1410 and a controlling module 1420.

The detection module 1410 may be configured to detect a preset alarm event. More descriptions regarding the detection of the preset alarm event may be found elsewhere in the present disclosure, for example, operation 810 in FIG. 8 and relevant descriptions thereof.

The controlling module 1420 may be configured to control the warning light to keep turned on within a time period associated with an overlapping region of the exposure rows. More descriptions regarding the controlling of the warning light may be found elsewhere in the present disclosure, for example, operation 820 in FIG. 8 and relevant descriptions thereof.

The controlling module 1420 may also be configured to control the warning light to flicker or keep turned on within a time period associated with a blanking region between two adjacent frames of a monitoring device (e.g., the monitoring device 130). More descriptions regarding the controlling of the warning light may be found elsewhere in the present disclosure, for example, operation 1120 in FIG. 11 and relevant descriptions thereof.

The modules in the monitoring control device 1400 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. In some embodiments, two or more of the modules may be combined as a single module, and any one of the modules may be divided into two or more units.

In some embodiments, the present disclosure may also provide a computer readable storage medium storing program data. The program data may be executed to implement a process (e.g., process 500, process 800, process 900, process 1000, process 1100, process 1200, process 1300) described elsewhere in the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or comlocation of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system, comprising:

at least one storage device including a set of instructions; and at least one processor in communication with the at least one storage device, wherein when executing the set of instructions, the at least one processor is directed to perform operations including:

obtaining one or more monitoring images associated with a monitoring region captured by a monitoring device;

determining whether a target event occurs in the monitoring region based on the one or more monitoring images;

in response to determining that the target event occurs in the monitoring region, obtaining, for a frame of the monitoring device, an end exposure time of a last exposure row among a plurality of exposure rows that are sequentially exposed by a shutter of the monitoring device;

obtaining, for a next frame of the monitoring device, a start exposure time of a first exposure row among the plurality of exposure rows;

determining a target time period associated with operations of a warning light associated with the monitoring device based on the end exposure time of the last exposure row corresponding to the frame and the start exposure time of the first exposure row corresponding to the next frame;

controlling the operations of the warning light based on the target time period;

determining a target blanking region based on reference parameters of the warning light, the reference parameters including a type of the warning light; and in response to determining that the monitoring device satisfies a preset condition, adjusting waiting time of the monitoring device based on the target blanking region; or in response to determining that the monitoring device does not satisfy the preset condition, determining adjustment parameters of the monitoring device based on the target blanking region.

2. The system of claim 1, wherein the in response to determining that the monitoring device does not satisfy the preset condition, determining adjustment parameters of the monitoring device based on the target blanking region includes:

determining the adjustment parameters based on the target blanking region and environmental characteristics, wherein the environmental characteristics include ambient light intensity.

3. The system of claim 1, wherein the in response to determining that the monitoring device does not satisfy the preset condition, determining adjustment parameters of the monitoring device based on the target blanking region includes:

determining at least one set of candidate adjustment parameters based on the target blanking region;

determining at least one energy consumption value corresponding to the at least one set of candidate adjustment parameters; and determining the adjustment parameters based on the at least one energy consumption value.

4. The system of claim 1, wherein the in response to determining that the monitoring device does not satisfy the preset condition, determining adjustment parameters of the monitoring device based on the target blanking region includes:

for each set of candidate adjustment parameters in the at least one set of candidate adjustment parameters, determining a first score based on the each set of candidate adjustment parameters, the target blanking region, and a type of the target event;

determining a second score based on the each set of candidate adjustment parameters, the target blanking region, and morphological change characteristics of the target event; and determining a comprehensive evaluation value based on the first score and the second score; and determining the adjustment parameters based on at least one comprehensive evaluation value corresponding to the at least one set of candidate adjustment parameters.

5. The system of claim 4, wherein the determining a comprehensive evaluation value based on the first score and the second score includes:

determining the comprehensive evaluation value based on the first score, the second score, and an energy consumption value corresponding to the each set of candidate adjustment parameters.

6. The system of claim 1, wherein the at least one processor is directed to perform operations including:

determining the target blanking region based on a type of the target event and morphological change characteristics of the target event.

7. The system of claim 1, wherein the reference parameters further include flicker characteristics, and the at least one processor is directed to perform operations including:

determining the flicker characteristics based on a type of the target event and morphological change characteristics of the target event.

8. The system of claim 1, wherein the at least one processor is directed to perform operations including:

in response to determining that the target event occurs in the monitoring region, controlling the warning light to remain lit and/or flicker in the target blanking region, and controlling the warning light to remain lit in the non-blanking region; or in response to determining that the target event does not occur in the monitoring region, determining whether to control the warning light to remain lit based on environmental characteristics.

9. The system of claim 8, wherein the in response to determining that the target event occurs in the monitoring region, controlling the warning light to remain lit and/or flicker in the target blanking region, and controlling the warning light to remain lit in the non-blanking region includes:

in response to determining that the target event occurs in the monitoring region, determining whether to control the warning light to remain lit in the target blanking region based on the environmental characteristics, and determining whether to control the warning light to remain lit in the non-blanking region based on the environmental characteristics.

10. The system of claim 1, wherein the controlling the operations of the warning light based on the target time period includes:

controlling the warning light to flicker within the target time period and to keep turned on outside of the target time period;

controlling the warning light to flicker within the target time period and to keep turned off outside of the target time period;

controlling the warning light to keep turned on within the target time period and to keep turned off outside of the target time period; or controlling the warning light to keep turned off within the target time period and to keep turned on outside of the target time period.

11. The system of claim 1, wherein the controlling the operations of the warning light based on the target time period includes:

for each of the operations of the warning light, determining a required time based on the reference parameters of the warning light a duty ratio of the warming warning light, a flicker frequency of the warming warning light, a high level duration, or a low level duration of the flicker of the warning light;

determining a required target time period based on at least one of the required times corresponding to the operations of the warning light;

adjusting the adjustment parameters of the monitoring device to adjust the target time period to satisfy the required target time period; and controlling the operations of the warning light based on the adjusted target time period.

12. The system of claim 1, wherein the determining a target time period further includes:

obtaining an end exposure time of a first exposure row among a plurality of exposure rows that are sequentially exposed by a shutter of the monitoring device;

obtaining a start exposure time of a last exposure row among the plurality of exposure rows; and determining the target time period based on the end exposure time of the first exposure row and the start exposure time of the last exposure row.

13. The system of claim 12, wherein the controlling the operations of the warning light based on the target time period includes:

controlling the warning light to keep turned on within the target time period and to keep turned off outside of the target time period.

14. The system of claim 13, wherein the controlling the operations of the warning light within the target time period includes:

determining whether the warning light associated with the monitoring device is turned on;

in response to determining that the warning light associated with the monitoring device is turned on, increasing, in the target time period, a power consumption of the warning light based at least in part on the at least one parameter of the monitoring device and the target time period; and controlling the warning light to keep turned on under the increased power consumption within the target time period.

15. The system of claim 12, wherein the determining a target time period further includes:

when a difference between the end exposure time of the first exposure row and the start exposure time of the last exposure row is less than or equal to 0, adjusting the adjustment parameters of the monitoring device so that the difference between the end exposure time of the first exposure row and the start exposure time of the last exposure row is larger than 0, determining an adjusted end exposure time of the first exposure row and an adjusted start exposure time of the last exposure row based on the adjustment parameters, and determining a difference between the adjusted end exposure time of the first exposure row and the adjusted start exposure time of the last exposure row as the target time period.

16. A method implemented on a computing device including at least one processor, at least one storage medium, and a communication platform connected to a network, the method comprising:

obtaining one or more monitoring images associated with a monitoring region captured by a monitoring device;

determining whether a target event occurs in the monitoring region based on the one or more monitoring images;

in response to determining that the target event occurs in the monitoring region, obtaining, for a frame of the monitoring device, an end exposure time of a last exposure row among a plurality of exposure rows that are sequentially exposed by a shutter of the monitoring device;

obtaining, for a next frame of the monitoring device, a start exposure time of a first exposure row among the plurality of exposure rows;

determining a target time period associated with operations of a warning light associated with the monitoring device based on the end exposure time of the last exposure row corresponding to the frame and the start exposure time of the first exposure row corresponding to the next frame;

controlling the operations of the warning light based on the target time period;

determining a target blanking region based on reference parameters of the warning light, the reference parameters including a type of the warning light; and in response to determining that the monitoring device satisfies a preset condition, adjusting waiting time of the monitoring device based on the target blanking region; or in response to determining that the monitoring device does not satisfy the preset condition, determining adjustment parameters of the monitoring device based on the target blanking region.

17. The method of claim 16, wherein the in response to determining that the monitoring device does not satisfy the preset condition, determining adjustment parameters of the monitoring device based on the target blanking region includes:

determining the adjustment parameters based on the target blanking region and environmental characteristics, wherein the environmental characteristics include ambient light intensity.

18. The method of claim 16, wherein the in response to determining that the monitoring device does not satisfy the preset condition, determining adjustment parameters of the monitoring device based on the target blanking region includes:

determining at least one set of candidate adjustment parameters based on the target blanking region;

determining at least one energy consumption value corresponding to the at least one set of candidate adjustment parameters; and determining the adjustment parameters based on the at least one energy consumption value.

19. The method of claim 16, wherein the in response to determining that the monitoring device does not satisfy the preset condition, determining adjustment parameters of the monitoring device based on the target blanking region includes:

for each set of candidate adjustment parameters in the at least one set of candidate adjustment parameters, determining a first score based on the each set of candidate adjustment parameters, the target blanking region, and a type of the target event;

determining a second score based on the each set of candidate adjustment parameters, the target blanking region, and morphological change characteristics of the target event; and determining a comprehensive evaluation value based on the first score and the second score; and determining the adjustment parameters based on at least one comprehensive evaluation value corresponding to the at least one set of candidate adjustment parameters.

20. A non-transitory computer readable medium, comprising executable instructions that, when executed by at least one processor, direct the at least one processor to perform a method, the method comprising:

obtaining one or more monitoring images associated with a monitoring region captured by a monitoring device;

determining whether a target event occurs in the monitoring region based on the one or more monitoring images;

in response to determining that the target event occurs in the monitoring region, obtaining, for a frame of the monitoring device, an end exposure time of a last exposure row among a plurality of exposure rows that are sequentially exposed by a shutter of the monitoring device;

obtaining, for a next frame of the monitoring device, a start exposure time of a first exposure row among the plurality of exposure rows;

determining a target time period associated with operations of a warning light associated with the monitoring device based on at least one parameter of the monitoring device based on the end exposure time of the last exposure row corresponding to the frame and the start exposure time of the first exposure row corresponding to the next frame;

controlling the operations of the warning light based on the target time period;

determining a target blanking region based on reference parameters of the warning light, the reference parameters including a type of the warning light; and in response to determining that the monitoring device satisfies a preset condition, adjusting waiting time of the monitoring device based on the target blanking region; or in response to determining that the monitoring device does not satisfy the preset condition, determining adjustment parameters of the monitoring device based on the target blanking region.

* * * * *